US007991754B2

(12) United States Patent  
Maizel et al.

(10) Patent No.: US 7,991,754 B2
(45) Date of Patent: Aug. 2, 2011

(54) SYSTEM FOR INTEGRATED UTILIZATION OF DATA TO IDENTIFY, CHARACTERIZE, AND SUPPORT SUCCESSFUL FARM AND LAND USE OPERATIONS

(75) Inventors: Margaret Stewart Maizel, Fort Collins, CO (US); William L. Thoen, Boulder, CO (US)

(73) Assignee: OneImage, LLC, Fort Collins, CO (US)

( * ) Notice: Subject to any disclaimer, the term of this patent is extended or adjusted under 35 U.S.C. 154(b) by 383 days.

(21) Appl. No.: 12/096,167

(22) PCT Filed: Dec. 5, 2006

(86) PCT No.: PCT/US2006/046465
§ 371 (c)(1),
(2), (4) Date: Jun. 4, 2008

(87) PCT Pub. No.: WO2007/067579
PCT Pub. Date: Jun. 14, 2007

(65) Prior Publication Data
US 2009/0313215 A1  Dec. 17, 2009

Related U.S. Application Data

(60) Provisional application No. 60/742,943, filed on Dec. 5, 2005.

(51) Int. Cl.
*G06F 7/00* (2006.01)
*G06F 17/30* (2006.01)
(52) U.S. Cl. .................. 707/705; 707/758; 707/776
(58) Field of Classification Search .................. None
See application file for complete search history.

(56) References Cited

U.S. PATENT DOCUMENTS
5,467,271 A   11/1995   Abel et al.
(Continued)

FOREIGN PATENT DOCUMENTS
WO   2007067579 A2   6/2007

OTHER PUBLICATIONS

Modelling for prediction of global deforestation based on the growth of human population, by Pahari et al., ISPRS Journal of Photogrammetry & Remote Sensing 54 (1999) 317-324.*

(Continued)

*Primary Examiner* — Jay A Morrison
(74) *Attorney, Agent, or Firm* — Santangelo Law Offices, P.C.

(57) ABSTRACT

Computer configurations, search processors (2), software, and methods of viewing and analyzing information regarding agriculture or land use automatically located relationally-linked agronomic entities with both real (18) and virtual (8) displays. Relational linking exist through broad assessment of commonality information with fuzzy logic heuristics. Dynamic link presentation (6) can exist with congregated and hierarchical information displays (29) such as at the farm level, at a location level, at a physically aggregated parcel level with hierarchical display of farms or agronomic entity ownership, management, organization, and crop usages that afford users an unprecedented series of views into the businesses of land use, food production, and resource conservation. A meta-syntactic agronomic information generator (31) can facilitate imputed information through the integration of multiple databases (32). Predictive and application-specific configurations can allow at-a-glance understanding of agronomic organizations and agronomic decision-making to see where to most optimally devote resources for higher success or efficiency.

15 Claims, 20 Drawing Sheets

U.S. PATENT DOCUMENTS

| | | | |
|---|---|---|---|
| 5,897,619 A | 4/1999 | Hargrove, Jr. et al. |
| 6,034,697 A | 3/2000 | Becker |
| 6,058,351 A | 5/2000 | McCauley |
| 6,107,961 A | 8/2000 | Takagi |
| 6,119,069 A | 9/2000 | McCauley |
| 6,208,345 B1 | 3/2001 | Sheard |
| 6,216,130 B1 | 4/2001 | Hougaard et al. |
| 6,240,360 B1 | 5/2001 | Phelan |
| 6,301,579 B1 | 10/2001 | Becker |
| 6,307,573 B1 | 10/2001 | Barros |
| 6,356,896 B1 | 3/2002 | Cheng et al. |
| 6,434,258 B2 | 8/2002 | Wiens |
| 6,442,483 B1 | 8/2002 | Doglione |
| 6,671,698 B2 | 12/2003 | Pickett et al. |
| 6,691,135 B2 | 2/2004 | Pickett et al. |
| 6,707,454 B1 | 3/2004 | Barg et al. |
| 6,990,459 B2 | 1/2006 | Schneider |
| 6,995,768 B2 | 2/2006 | Jou et al. |
| 6,999,877 B1 | 2/2006 | Dyer et al. |
| 7,015,911 B2 | 3/2006 | Shaughnessy et al. |
| 7,047,133 B1 | 5/2006 | Dyer et al. |
| 7,047,135 B2 | 5/2006 | Dyer et al. |
| 7,054,741 B2 | 5/2006 | Harrison et al. |
| 2002/0040273 A1 | 4/2002 | John et al. |
| 2002/0075329 A1 | 6/2002 | Prabhu et al. |
| 2002/0198736 A1 | 12/2002 | Harrison |
| 2003/0071814 A1 | 4/2003 | Jou et al. |
| 2003/0085918 A1 | 5/2003 | Beaumont et al. |
| 2003/0158850 A1* | 8/2003 | Lawrence et al. ............ 707/100 |
| 2003/0220734 A1 | 11/2003 | Harrison et al. |
| 2005/0116696 A1 | 6/2005 | Suematsu |
| 2005/0125237 A1 | 6/2005 | Harrison |
| 2006/0074560 A1 | 4/2006 | Dyer et al. |
| 2006/0125828 A1 | 6/2006 | Harrison et al. |
| 2006/0197763 A1 | 9/2006 | Harrison et al. |
| 2007/0143345 A1* | 6/2007 | Jones et al. ................ 707/104.1 |

OTHER PUBLICATIONS

U.S. Appl. No. 60/726,505, filed on Oct. 12, 2005.*
Historical Corn Productivity Index, North Central States (Actual Yield/Potential Yield); Resource Management Domains in Illinois, Productivity Index, 1998, 2 pages.
U.S. Appl. No. 60/742,943, filed Dec. 5, 2005.

* cited by examiner

KEY

Corn, Yellow

Soybeans, Common

Conservation Reserve Program

Alfalfa

Peas, Sweet

RFARM

Double-cropped

CLU Boundary

1  Field Number
54.3  acres in this field

⟨1⟩ Selected Grower with Tenure type Owner/Operator non-Selected growers, Tenure types:

② Owner

③ Operator

④ Other

SYSTEM FOR INTEGRATED UTILIZATION OF DATA TO IDENTIFY, CHARACTERIZE, AND SUPPORT SUCCESSFUL FARM AND LAND USE OPERATIONS

This application is the United States National Stage of International Application No. PCT/US2006/46465, filed Dec. 5, 2006 which claims the benefit of U.S. Patent Application 60/742,943 entitled "System for Integrated Utilization of GIS and Agriculturally-Related Information" by the same inventors filed Dec. 5, 2005 hereby incorporated by reference.

TECHNICAL FIELD

The present invention is directed primarily to the field of utilizing and generating agriculturally-related information. While it may also be directed to fields other than agricultural-related information, it is most expediently explained in this first application. Generally, and in an agricultural context, the invention is applicable in situations in which agricultural, land-based, or other information can be applied and understood in a geographic and data framework. Specifically, the invention permits analysis, generation, and use of agronomic and other information by integrating it with and in a geographic or geo-spatial framework. In this manner, as applied in the exemplary agricultural context; it facilitates applications such as use of the information for seed, crop, land-usage, and agronomic sales purposes.

BACKGROUND

The desire to provide land use information in an easily understood format has existed for years. This desire is particularly important for agricultural applications. In making decisions relative to farm operations, it is a well known fact that many operations are intertwined with common ownership, management, control, or other relational aspects. Unfortunately, it can be very difficult to understand the web of interactions that may often exist in an agronomic context. Historically, sales persons or other service providers often have worked hard to gain the knowledge of who-owns-who and who-runs-who. This knowledge has often been developed through a long course of dealing (and a good memory) by sales persons or other service persons involved in a specific county or other geographic area. While there may never be a full replacement for the person interactions that help develop such information, what has been long desired is a system that could aid in developing such understandings. While computing systems have developed and significant database information has existed at some levels, it has remained difficult to see relationships; data is often not easily assembled to provide such information and to augment the personal interactions through which such information has historically been developed.

Agricultural software relative to farm management and database interactions has existed for some time. A computerized system for farm insurance decision making is disclosed in U.S. Pat. No. 5,897,619 entitled "Farm Management System". This computerized system uses data from a variety of sources to determine field production history for a specific parcel or insurance unit. This information is then applied to set rates for that insurance and the like. It also generates site-specific information to verify insurance claims and the like. It does not, however, disclose a system that scours information databases for the types of relational ties that exist across differing entities.

Others have similarly used available information on individual parcels or even from wide area databases to provide management input for specific parcels. In fact, as early as 1998, one of the inventors of the present invention provided an early disclosure of the use of productivity indexes across geographies and other elements to glean interactions of information on a more global scale in order to identify resource management domains that could be used to not only identify historical change in agriculture land use, but also to aid in farm management and crop selection for a specific parcel. Similarly, U.S. Pat. No. 6,058,351 for "Management Zones for Precision Farming" disclosed a use of information and data in order to determine specific management zones in a field to permit precise farming. As that patent explains, crop production can be optimized by considering spatial variations that exist within a given farming field. Implicitly it demonstrates that economics can be significantly impacted by an understanding of geospatial criteria. It does not, however, disclose a system that adequately allows data on more than one agronomic entity to be understood in an agronomic context. Similarly, U.S. Pat. No. 6,990,459 for "System and Method for Developing a Farm Management Plan for Production Agriculture" shows a computer system for farm management to optimize economics of multi-year crop selection, crop rotation, or the like using imported data. Again, however, this is system focuses on data from individual farms for optimization. Further developments have followed this same theme even expanded to a larger area of impact. U.S. Pat. Nos. 6,999,877, 7,047,133, and 7,047,135 each show computerized systems that permit performance evaluation of agricultural crops using data relative to specific geographic locations or areas with significant focus on decision making and prediction relative to a farm, farms, or regions of interest. They do not disclose discerning indirect or other relations such as is often desired in this context.

Other patents disclose the use of computer automation in order to track and protect the use of the specific crops or such as genetically modified organisms. U.S. Pat. Nos. 6,691,135 and 6,671,698, each entitled "Method and System for Automated Tracing of an Agricultural Product", disclose computer systems that can integrate geospatial use information with specific labels or containers in order to have an understanding of the locations at which such crops are used or stored. Even though apparently considering neighboring land impacts, these patents focus on individual uses and do not provide for a relational integration of information between various agronomic entities.

Considerable attention has also been given to the use of computers in order to provide accurate geospatial land description information. U.S. Pat. No. 5,467,271, entitled "Mapping and Analysis Systems for Precision Farming Applications" discloses specific techniques available, in order to generate agricultural maps that can ultimately be used to optimize productivity of the farming field. This technology involves a geo-referencing device that synchronizes position data to analyze a farming field. No consideration is provided relative to relational interactions among different farming entities. U.S. Pat. No. 6,119,069 is entitled "System and Method for Deriving Field Boundaries using Alpha Shapes." This patent discloses a computerized system that can determine the boundaries of fields for use in a geospatial application. It focuses on defining the boundary, not on interactions and relations of farming entities. Similarly, U.S. Pat. No. 6,442,483, entitled "System and Method for Defining and Creating Surrogate Addresses for Township and Range Quarter Sections", involves a computerized system that translates land descriptions such as may be used in the US public land survey system. This individualized focus does not address any understanding of the interactions between different entities and different farms. Similarly, US patent application US20020059091 entitled "Apparatus and Methods for Selecting Farms to Grow a Crop of Interest" discloses a technology whereby farms can be managed and crops selected based on economic criteria of interest. Again it does not involve relational interactions between various farming entities.

In spite of the advances made in the use of computing systems in an agronomic context, until the present invention, no system has been available that adequately considers the interaction and interplay between different economic entities as such may be applicable in a particular situation. A need has existed whereby the interplay of information can be considered and integrated into either an analysis or a presentation from which practical decisions can be made. Furthermore, no automated system has existed that provides the level of analysis that can provide information which, while not existing under precise analysis, can be understood to exist on a conceptual basis nonetheless and can be applied in order to provide more in depth decision-making. No system has existed that could indicate indirect relational links between different agronomic entities and perhaps could even generate virtual information that can aid in such an understanding.

SUMMARY DISCLOSURE OF THE INVENTION

In an initial embodiment to consider, the invention presents software and data package for viewing and analyzing information about the structure of an agriculture or land use component. This may be presented at the farm level, at a location level, at a physically aggregated parcel level, or even at a physically aggregated parcel component level to name a few examples. Embodiments of the system may describe entities, such as farms, and their management, organization, productivity, and programs. Through a congregated display and perhaps even through generation of virtual information, an embodiment may afford users an unprecedented series of views into the businesses of land use, food production, and resource conservation. In some embodiments, virtual information can be generated through the integration of multiple datasets and multiple databases having some bearing on farm management or agronomic involvement.

In application, embodiments of the invention can allow managers, salespeople, or others involved, to at-a-glance understand relational aspects such as the organization and decision-making of any farm (or other product), to know how inputs can be fed into a farm (or other product's) operation or a relationally-linked entity through various persons. Such persons may be operators who may or may not be customers or who, for instance, may have purchased certain equipment, used farm credit and/or who have any other attributes as customers or prospects that can be tied to a farm or the organization of the farm. In embodiments of the system, perhaps every one of perhaps millions of farms may be visually and graphically displayed as a virtual farm or otherwise. Embodiments may also indicate the history of a farm or other product target. Such could be described, for instance, as to whether it has grown/decreased, diversified, changed management, or otherwise changed over time. Characteristics desired may be selectable by the user such as the characteristics of a successful or desirable farm or other target product and the like.

Embodiments of the system can be designed to provide managers or other persons involved access to huge data sets where GIS operations are only part of the picture (and may even go on in the background), freeing program managers from being GIS trained or skilled. Embodiments can allow analysis of key agricultural or other data sets in an efficient manner. Interfaces can be established for an entire region (such as the entire US) or may be customizable for specific purposes (e.g., research, marketing and other analyses.)

BRIEF DESCRIPTION OF THE FIGURES

FIG. 3a is an overall depiction of a composite display showing selectability sequence interrelations.

FIG. 3b is a blow-up of the locator map portion of FIG. 3a.

FIG. 3c is a blow-up of the grower map selection portion of FIG. 3a.

FIG. 3d is a blow-up of the selectable list item portion of FIG. 3a.

FIG. 3e is a blow-up of the grower form, item 46 portion of FIG. 3a.

FIG. 3f is a blow-up of the grower operations summary, item 47 portion of FIG. 3a.

FIG. 3g is a blow-up of the farms and tracts list, item 48 portion of FIG. 3a.

FIG. 3h is a blow-up of the tract summary, item 49 portion of FIG. 3a.

FIG. 3i is a blow-up of the agronomic selection menu portion of FIG. 3a.

FIG. 3j is a blow-up of the farm summary, item 51 portion of FIG. 3a.

FIG. 4 is an overall depiction of a composite display showing selectability sequence interrelations.

FIG. 5a is a blow-up of the VFarm portion of FIG. 3a.

FIG. 5b is a key to the drawing in FIG. 5a.

FIG. 6 is a blow-up of the initial target, item 7 portion of FIG. 3a.

FIG. 7b is a blow-up of a farm agronomics item portion similar to that in FIG. 7a.

FIG. 7c is a blow-up of a soils item portion similar to that in FIG. 7a.

FIG. 7d is a blow-up of a soils click flow diagram of another embodiment similar to the soils (stasgo) item portion of FIG. 7a.

FIG. 7e is a blow-up of a climate click flow diagram of another embodiment similar to the climate item portion of FIG. 7a.

FIG. 7f is a blow-up of a crop yield click flow diagram of another embodiment similar to the NASS crop yields item portion of FIG. 7a.

FIG. 7g is a blow-up of a farm agronomics click flow diagram of another embodiment similar to the farm agronomics item portion of FIG. 7a.

FIG. 7i is a blow-up of a NASS crop yields item portion similar to that in FIG. 7a.

MODES FOR CARRYING OUT THE INVENTION

As will be understood from the following description and the figures, the invention can include a variety of embodiments that may be used and configured in different ways. In somewhat general terms, the invention may include an interaction function or interaction element with a variety of possibilities. These may include internet access, graphic displays, sequential in and out functionalities, and even specific computer or software configurations for focused applications. As applied to farm management or ownership, family tree coordination of information can be provided. Visually intuitive or other graphical user interfaces to simplify analysis, presentation, and understanding of the data can also be provided. Ownership and management ties can be shown and analyzed for ties in a geographical framework. This may include change structures and linking for a set or variable period of time, such as the current year, two years, or otherwise. Historical information can be presented in the context of the application, the change information, or the like. Equipment or other information and farm location linkage can be constructed and presented. Even success or perhaps yield criteria functionality can be provided or estimated as might be appropriate to a particular context such as sales likelihood, use likelihood, and even product value to the particular enterprise and/or context involved.

Real boundary linkage can also be included to permit integration of adjacent or similar criteria-selected entities or information analysis. As is referenced, in-field spatial information capture, updating, or revision can be included in some embodiments. This may accomplished in an isolated, inter-, or intra-net structure as well. User information can even link to particular datasets or subsets perhaps with one-click ease or simplicity. Yield rates can be geographically assessed and perhaps even compared with adjacent or other criteria-selected information. Market contacts can be synthesized on selected criteria and end-use details can be organized and displayed. Information such as farm field and tract information can be graphically displayed. Planning, grouping, congregating, and possible predictive outcomes or functions can be input, provided, or displayed. The entire system can even be configured for use in an information-priced business model. Real time or on-the-fly street addressing functionality can be provided. It may also be configured to segment datasets for more usability and even to integrate with individual or proprietary information or data.

Figure 1:
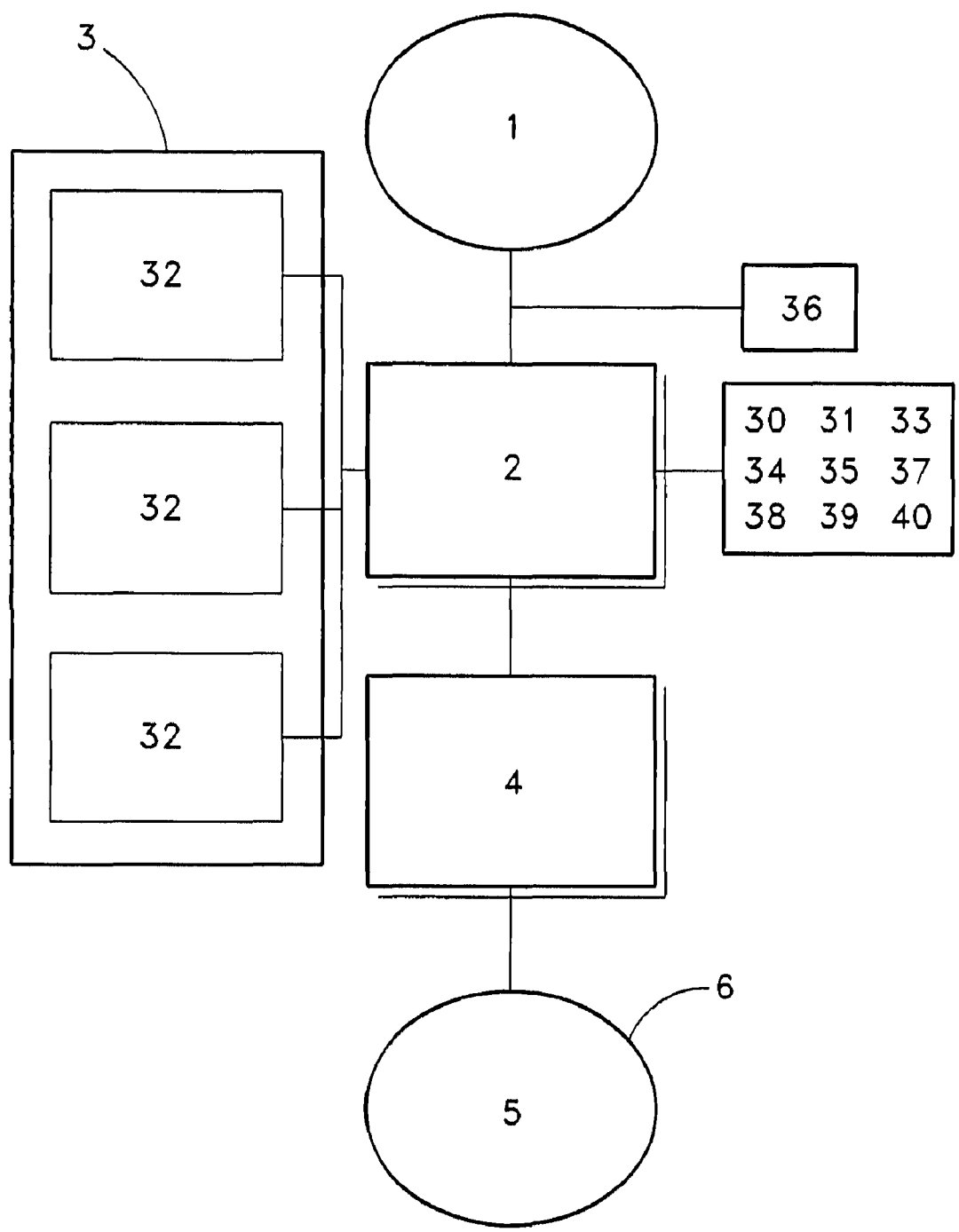
FIG. 1 is a schematic diagram of a computer system according to one embodiment of the invention having a relationally-linked agronomic search processor.

Referring to FIG. 1, the system can be understood in the context of one embodiment. In this one embodiment, the invention can be established as a computer system configured to accomplish certain aspects. In a schematic representation of the hardware or functionality involved, it can be seen that an initial agronomic target identification entity (1) can be provided to permit a user to add an initial target of some sort. This starting point can be selected by person, name, location, enterprise, or other type of selection criteria.

In this embodiment, once an initial agronomic target is selected, the system can act to automatically accomplish certain processing. In a computer configuration, the processing may be accomplished by a microprocessor or a processor configured to accomplish a certain task. The processor may be configured or programmed as a relationally-linked agronomic search processor (2). The relationally-linked agronomic search processor (2), may be configured such as by software or subroutines to accomplish a search of certain agronomic or other data in order to locate information that is relationally-linked to an initial agronomic target. Some of these are discussed later and are indicated as the numbered routines or programming within or associated with the relationally-linked agronomic search processor (2). Charges and access can be handled through the fee-based access controller (36) shown. This is also discussed in more detail later. Searching may be accomplished by accessing an agronomic information data set (3), which contains information that may present data facilitating a direct or an indirect conclusion relative to the issue considered.

Within the agronomic information data set (3), there may be a variety of databases. Multiple databases (32), may be used in order to achieve appropriate search, comparison, and perhaps even data generation functions. Once an appropriate comparison or search function is accomplished such as by a relationally-linked agronomic search processor (2), the computer system may function as containing a multiple agronomic entity data accumulator (4). The multiple agronomic entity data accumulator (4) may be a functionality within a microprocessor or other software that utilizes data from at least one additional relationally-linked agronomic entity, such as a different entity that has some type of relational link with the initial agronomic target. It should be understood that this link can include a variety of information aspects as indicated later. Once the multiple agronomic entity data accumulator (4) accomplishes its function such as by assembling appropriate information, the overall computer system can act to provide an agronomic data output (5). This agronomic data output (5), can be any type of output desired. In some embodiments, the agronomic data output (5), may be a computer display or even a print out. Computer displays and even a dynamic link agronomic output (6) are indicated as but one type of output.

In various embodiments, the multiple agronomic entity data accumulator (4) can be configured to accomplish different accumulation tasks. It may be configured to congregate land cover information such as information that indicates the type of overlying growth other topologic features for the land. In such a configuration, the accumulator can be considered a land cover information accumulator. (Throughout this discussion, this type of characterization—where configuration or programming to achieve a specific result presents a particular element—should be understood to extend across this disclosure to all aspects mentioned.) Another configuration is for the multiple agronomic entity data accumulator (4), to be configured to congregate land tenure information. This type of information relates to tenancy and other uses of the land.

Embodiments can also be configured to congregate livestock information. This is to be broadly understood such that any type of information useful to or relating to a livestock operation can be included. Configurations can congregate farm identification information as well. In this fashion, the system might congregate various tracts within a farm or even various farm identification numbers or the like. This is shown in one example in FIG. 4 discussed later. In being configured to congregate, different types of information, the multiple agronomic entity data accumulator (4) can congregate physically aggregated parcels, and even components of such physically aggregated parcels. Land attributes, and even particular management practices can be considered, searched, congregated, and even accumulated. information relative to the use of nutrients or hybrid seeds can be congregated. Similarly, various crop practices such as rotation of fields, rows/foot, seed densities, crop alternation techniques, or other aspects can be searched, analyzed, considered, or congregated to understand relationships between entities and to better predict outcomes or the like.

Figure 2:
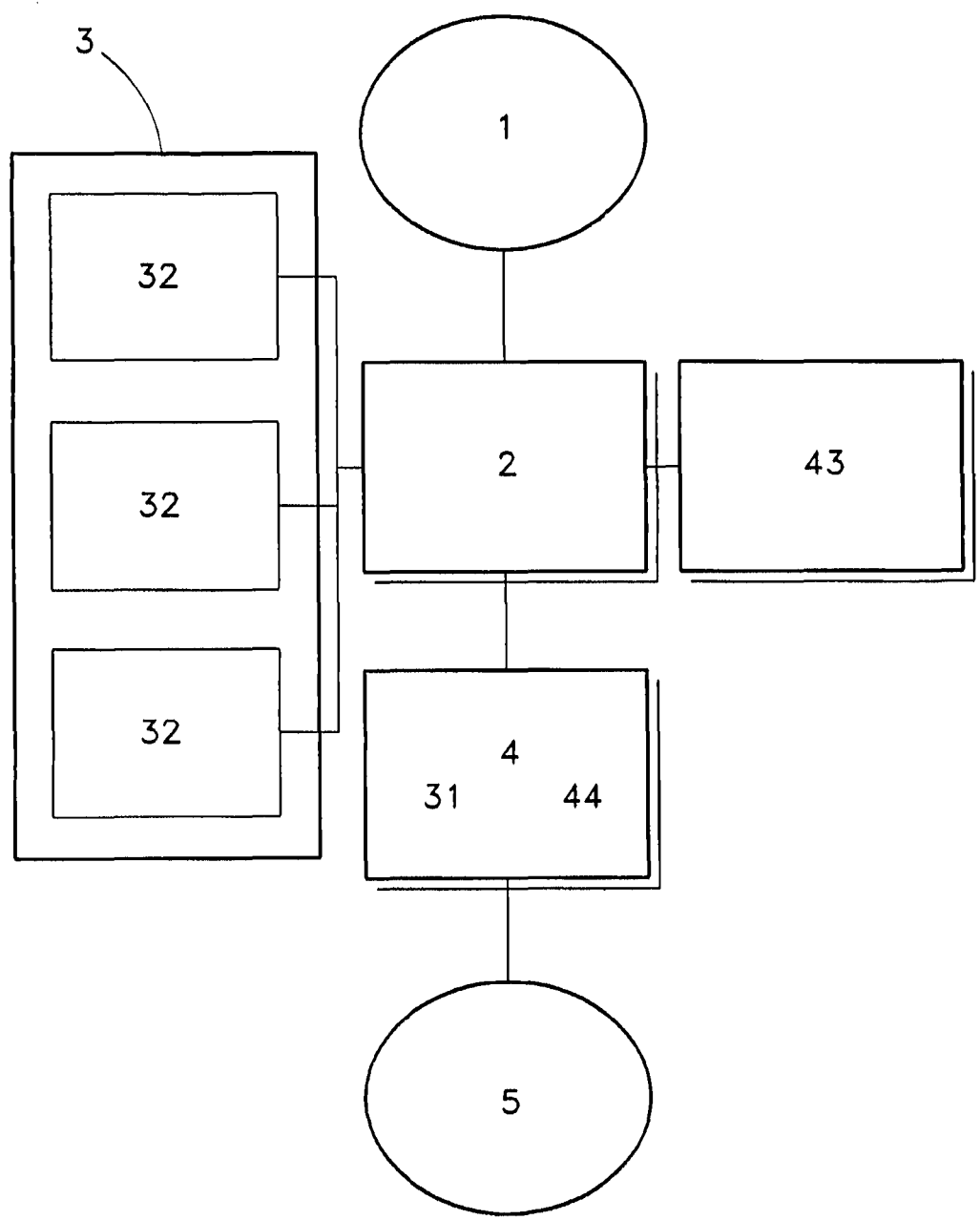
FIG. 2 is a schematic diagram of a computer system according to another embodiment of the invention having a multiple agronomic entity data correlation processor with an agronomic expansion criteria designator.

Yet another configuration of the system can be as indicated in FIG. 2. In this embodiment, a computer system can be configured to provide an initial agronomic target identification entity (1) with a relationally-linked agronomic search processor (2). As before, the system can accomplish desired search processes through interaction with an agronomic information data set (3), or perhaps even multiple databases (32). For specific applications, the relationally-linked agronomic search processor (2), can function according to certain criteria. Such criteria may be designated through user selection or perhaps by default or automatic designation. Regardless, this can be accomplished through the computer functioning as including an agronomic expansion criteria designator (43). This agronomic expansion criteria designator (43) can act to create an appropriate expansion criteria in order to accomplish desired tasks and meet desired goals. Once the relationally-linked agronomic search processor (2) accomplishes its search functions, in this embodiment the results may be processed within the computer for correlation. This processing can occur by the computer acting as a multiple agronomic entity data correlation processor (44) or perhaps a multiple entity correlator (44). This element can serve to correlate results of the search and provide them to an appropriate agronomic data output (5). Similar to the discussion earlier, it should be understood that the multiple agronomic entity data correlation processor (44) may be configured such as by software or subroutines to accomplish correlation or other functions for certain agronomic or other data in order to provide information that is desired. Some of these are discussed later and are indicated as the numbered routines or programming within or associated with the multiple entity correlator (44).

As may be easily understood for both figures, the above element designations are conceptual in nature. Certainly, in one embodiment a multipurpose computing platform is envisioned. As such, the multipurpose computing platform may include elements such as multiple microprocessors, separate memory chips, and other aspects that together can be considered as accomplishing the above indicated element. In general, it should be understood that when a multipurpose computing platform is configured to accomplish the indicated functions, components of the platform itself may serve as the indicated elements. For instance, when a microprocessor functionality is configured to accomplish a relationally-linked agronomic search, it should be considered as a relationally-linked agronomic search processor (2). Similarly, when that same microprocessor is programmed to accomplish accumulation or assemblage of multiple agronomic entity information, that microprocessor functionality should be considered as a multiple agronomic entity data accumulator (4). The element can be considered an item of hardware configured through electronic commands or as a program, subroutine, or instruction set within software. By this general understanding, it can be appreciated that the invention encompasses devices, memory, and computers configured to accomplish the indicated tasks. As such, software or hardware to accomplish these tasks, and even the subroutines, instruction sets, or components involved in such should be considered as falling within the scope of the invention and its claims as appropriate.

It can be further understood how a system according to the present invention can have the indicated elements. In both FIGS. 1 and 2, an embodiment accomplishes a relationally-linked agronomic search. The relationally-linked agronomic search processor (2) can function to search data and provide returns of relevant information. In order to access the information, the relationally-linked agronomic search processor (2), can function to request information on an initial agronomic target. It can then serve to locate at least some information on the target and then to create an information set on that initial agronomic target. This information set may be established either permanently or transiently such as in a computational random access memory or the like.

Importantly, this entire search function may be accomplished automatically. The relationally-linked agronomic search processor (2) can search to see if there is any useful information on an additional agronomic entity. This additional agronomic entity may be relationally-linked, that is may have some information, which provides the user a benefit by having some bearing on the initial entity, between the two entities, in a particular agronomic (or other) context, or in a particular environment. Information on at least one additional agronomic entity may be of import in a specific interaction environment. The interaction environment can vary based on the goals of a particular embodiment.

Figure 3A:
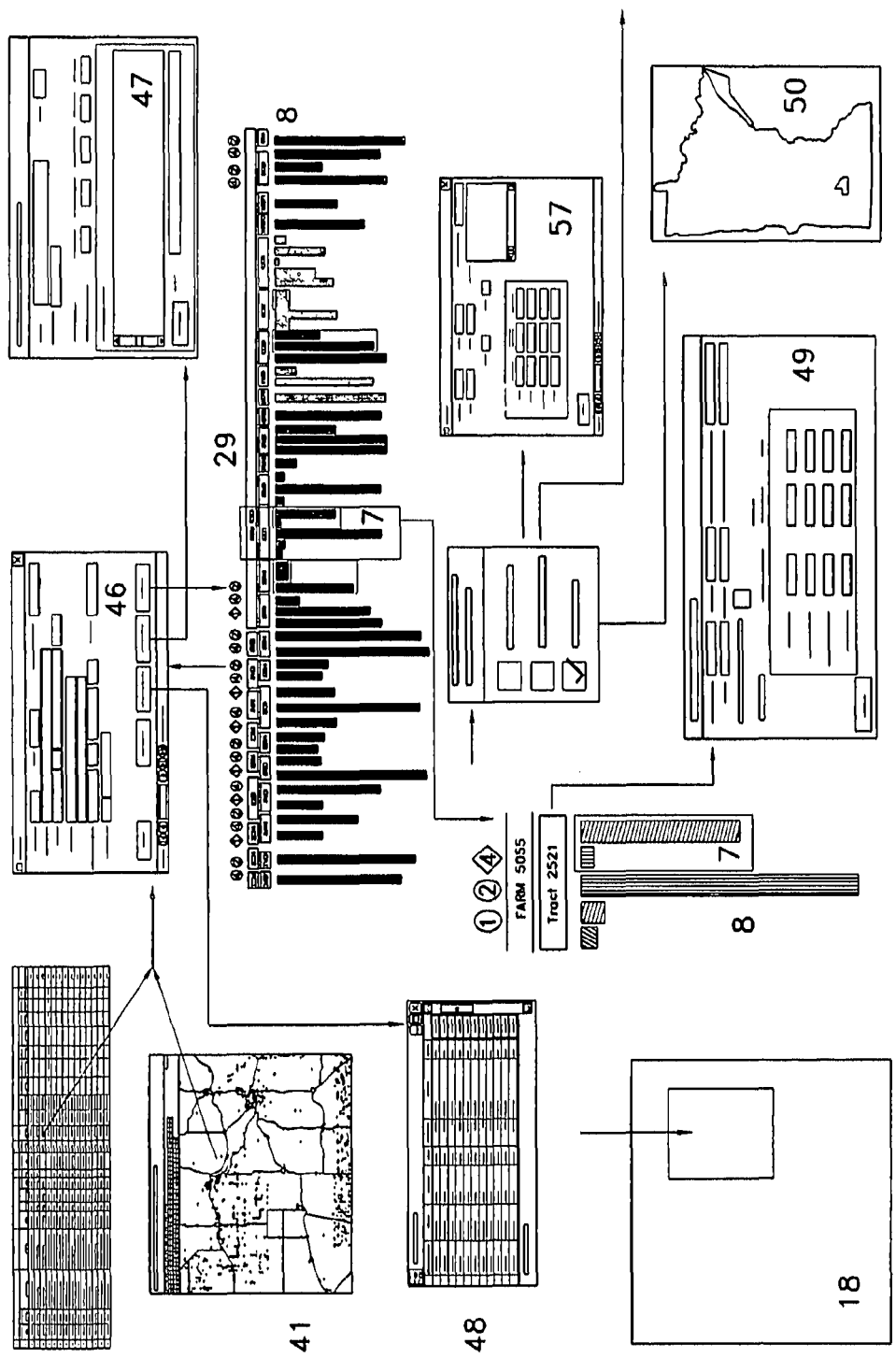
FIGS. 3a and 4 show click flow diagrams of how one embodiment might be configured with illustration of how a hypothetical example might be analyzed.
Figure 3B:
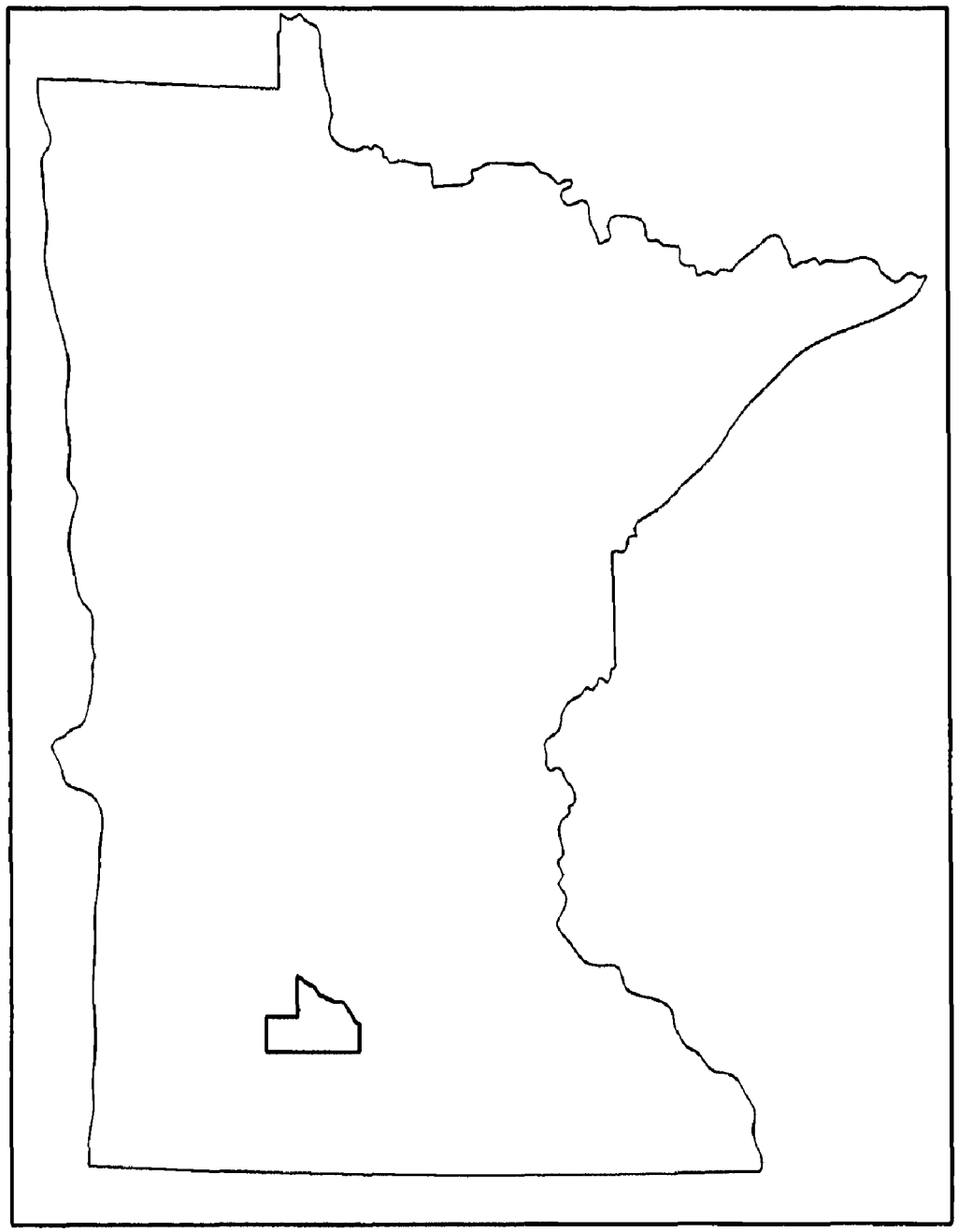
Figure 3C:
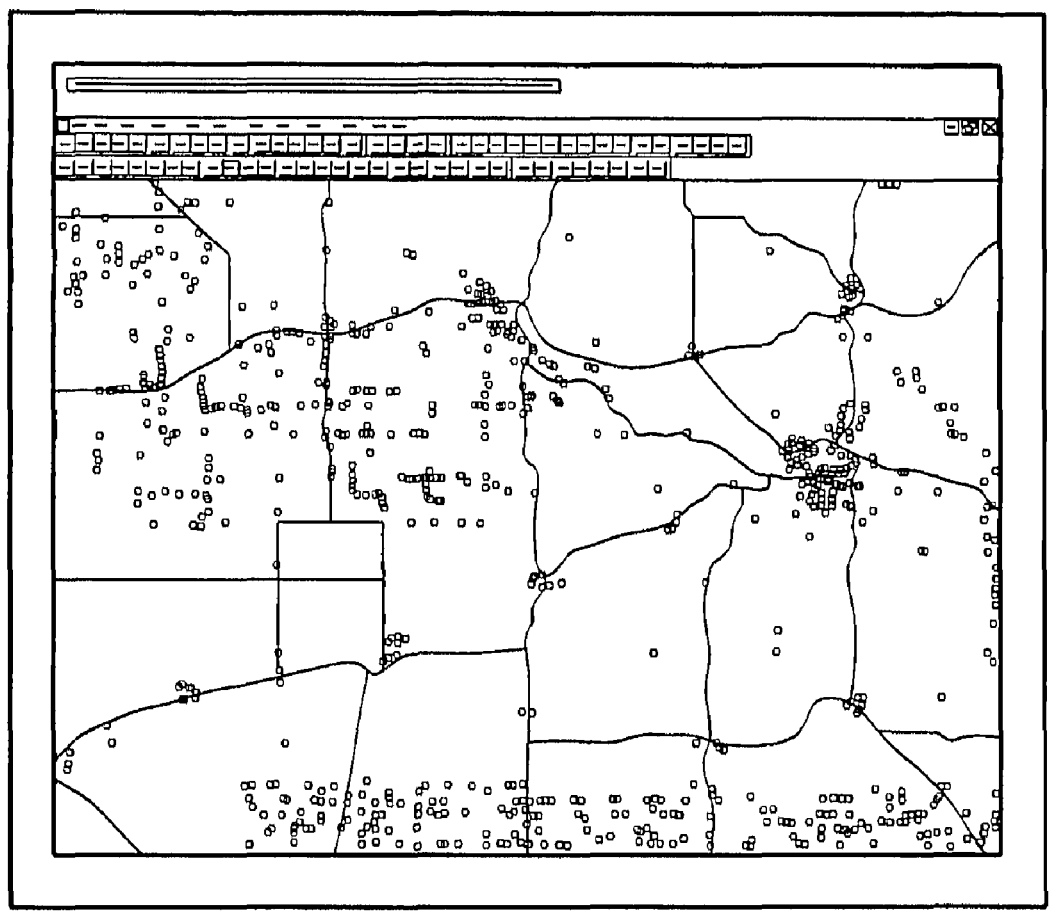
Figure 3D:
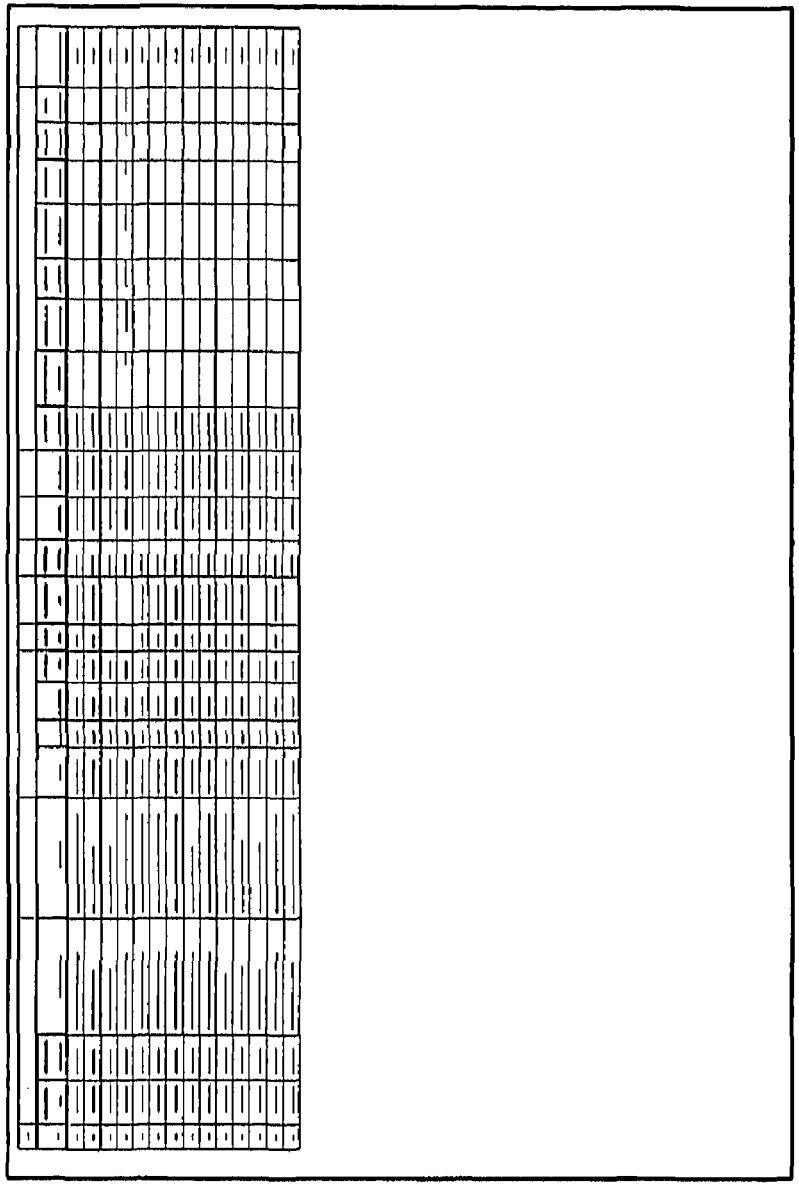
Figure 3E:
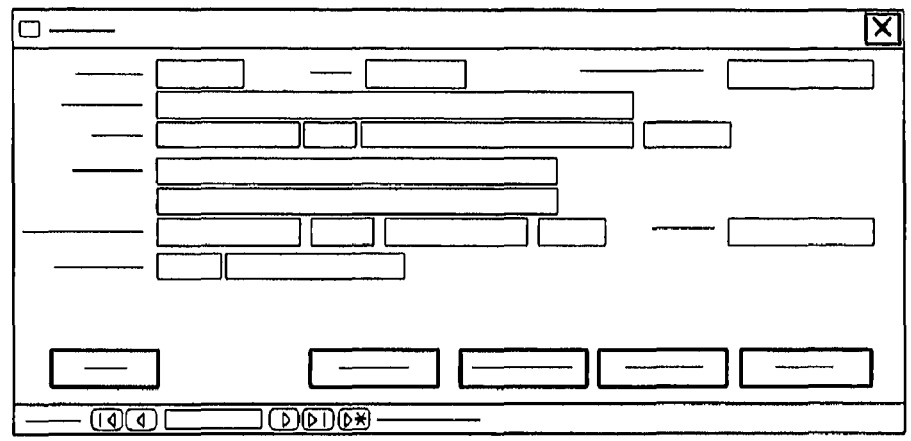
Figure 3F:
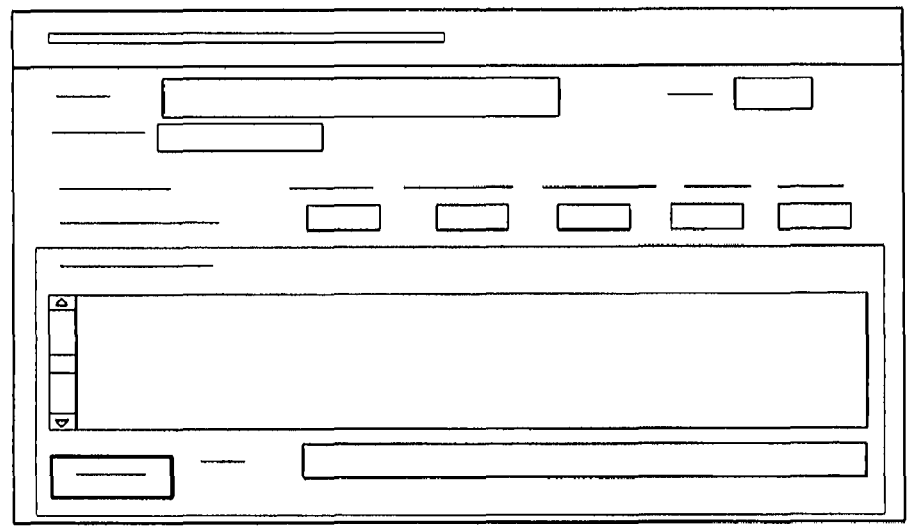
Figure 3G:
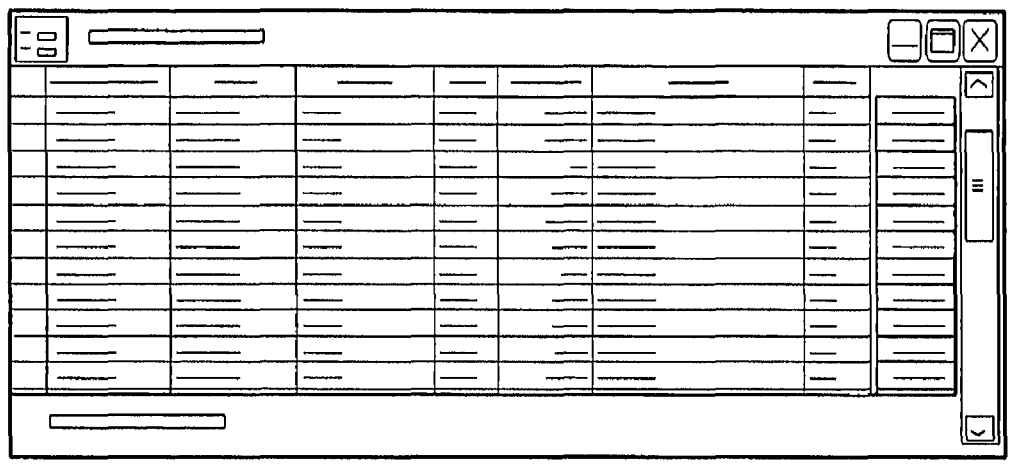
Figure 3H:
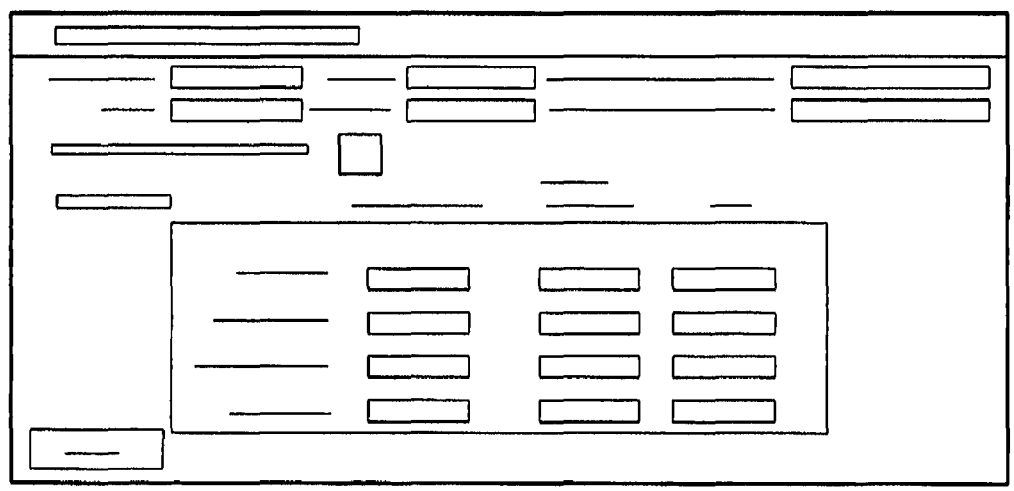

Referring to FIG. 3a, a sales application environment use of an embodiment can provide context. In this context, it may be it may be helpful to know parties who are operationally or perhaps even genetically related to persons of the initial agronomic target. In such an instance, the relationally-linked agronomic search processor (2) could be configured to assess any interaction environment, such as a land ownership or use environment. As shown in FIG. 3a, ownership and management interaction environments can permit the relationally-linked agronomic search processor (2) to act to locate at least some interaction environment auxiliary information, such as related ownership/management parcels or the like. Such information could include (as but one example) information as simple as the names of other agronomic entities that may be related or relevant in some manner or from some perspective. By locating these other agronomic entities, the relationally-linked agronomic search processor (2), can provide information that is correlated to an initial agronomic target. This correlation can be direct or indirect. Once it determines that some items of information may be relevant, the relationally-linked agronomic search processor (2) may act alone or in conjunction with other computer components to provide the information. The computer may act to create an interaction environment correlative information presentment. This presentment could be a collection of some information, and perhaps even a congregation of information. In this example, it may immediately show potential or real relationships among various entities. This automated agronomic relational information creation system can then provide an agronomic data output so that the user can utilize information, as appropriate to a particular context.

In the example shown in FIG. 3a, by selecting an initial agronomic target (7) such as from the geospatial agronomic image display (41), this embodiment can act automatically to generate information on the entity such as a dynamic link display (8) of the initial agronomic target (7). This information can in turn automatically cause the generation of auxiliary information and perhaps a hierarchical congregated information display (29) from which relations between ownership and management can be understood. More detailed information on any aspect of the above can be provided as indicated in grower form (46), grower operations summary form (47), tract form (48), tract summary form (49), locator map (50), and farm summary form (51).

Returning to a more general discussion, it should be understood that the environments within which auxiliary information can be located, generated, or merely considered, can vary significantly. These are limited perhaps only by a user's creativity. In the type of embodiments indicated in FIG. 3a, information environments can include land management, farm management, and land use environments. Livestock environments can also be included. In a broader sense, the environments can include a production input environment, such as any environment where there is a meaningful input to achieve a result or for some type of production consideration.

A production enhancement environment can also be considered. This can be as broad as any type of enhancement input or consideration that aids in production, that is relevant to a product, or that enhances some activity.

Focusing on crops, the environment within which auxiliary information can be analyzed and searched, can be a crop enhancement environment, a crop production environment, a crop planting environment, or even a crop protection environment to name just a few. Uses and needs can similarly define an environment. A product need environment (which can include a plant or crop need), an equipment purchase environment, an apparent equipment usage or need environment, and even a farm credit usage environment can be defined and the computer configured to achieve those tasks or work within those environments. More physically-oriented environments can also exist such as a pesticide use environment, a hybrid seed environment, or the like. The environments within which auxiliary information can be considered can also include service environments such as a financial services environment as might exist when considering opportunities to aid those involved in a financial way. These could also range to a bank lending services environment, or even an insurance services environment. More technical service environments can also be defined such as an engineering services environment, an irrigation services environment, and an agronomic consulting services environment. Purely commercial sales or retail environments can be considered. These can include a sales territory environment, a sales lead environment, and the like. Naturally, all permutations and combinations of these and other aspect can exist as well.

As indicated in FIG. 3a, information can be assembled in order to permit a user to instantly see many relations that may exist. Although shown hierarchically in this one embodiment, it should be understood that such relations and outputs can be linear, inductive, reductive, temporal, and even conclusory. The information and display itself can be used to reselect information or displays with click-flow or functional software relations as indicated by the arrows shown. In specific, it can be seen in FIG. 3a that information on some initial agronomic target is selectable and perhaps displayable in a real and/or virtual fashion as shown. As shown by elements 18 and 7, the invention may include simultaneous real (18) and virtual (8) land use information data output. This simultaneous real and virtual land use information data output (18 & 8) may include a real and virtual component. The real component may be as specific as a satellite image such as shown in item (18) in this embodiment. The real component may also be a geospatial image or some depiction of the actual initial agronomic target or the like. The virtual component may include a synthetic display of acreage or crops such as for individual or collected fields within a particular entity or parcel. This display may be configured to criteria such as acreage or the like to show the relative size of croplands. The virtual display may be organized hierarchically and may even include information on the initial agronomic target (7). Such a display may have one or more resettable initial agronomic target display (45) as explained later.

As shown in FIG. 3a, the identification of an additional agronomic target (7) may be accomplished by entry or selection from a list. This last or selection may be off a map, such as the geospatial agronomic image display (41). Selection may also be accomplished from an alphabetical list, or even from a farm number or the like. A menu command may present a selectable form which may allow a user to select one or more growers from a list of growers perhaps sorted by entity name. The list may be limited to all growers that appear in the current basemap view, plus any non-mapped growers located in the counties that intersect the map view. A user can also pick one or more growers for use in subsequent operations as well. Selection tables can also be generated from other sources (e.g. a list of a company's clients, etc). When one or more growers are selected from a map or the like, the system may automatically bring up a grower form for that selection. This may display contact and address information or the like and may be configured to aid in confirmation or in selection when growers are too densely located on a map to conveniently use a map selection tool. Selection may be made from a grower's name, location, number of farms operated, total farmland, acres in certain crops, conservation practices, or the like. The user may also be able to pre-identify whether the grower is a customer or a prospect if a prospects list has been matched to a user's customer list or the like.

Embodiments may facilitate entry with various levels of characterization. For example, configuration may provide for entry by enterprise, crop type, livestock type, id number, grower contact information, yield character, field identification, or the like. Each of these can be combined with any other as well as each may provide menu selection from any of a great variety of selectable entries, such as name, address, county, long or truncated legal description, zip code, acreage, parcel acreage, or other indicator appropriate for a particular system or application.

Once selected, information on an initial agronomic target (7) may be displayed in text or a table such as in grower form (46). Furthermore, some functionality can be provided whereby a user can expand the information. In the example shown, by clicking the operations button of the grower form (46), a grower operations summary form (47) can be provided. This is shown by the click-flow arrow indication in FIG. 3a. The summary form can be associated and provided with associated tabular data perhaps with more detail on the specific identified initial agronomic target (7). Similarly, information on related farms and tracts and be provided such as indicated in the tract form (48) selectable in this embodiment through a button as indicated.

Similar to the way in which the system could provide grower and operations information, individual tract information can be provided as well. As indicated in FIG. 3a, by clicking on the tract number as indicated in the virtual information display for the initial agronomic entity, a tract summary form (49) can be provided. Additional information such as a locator map (50) and a farm summary form (51) can also be provided at a farm level with click-flows as indicated, perhaps by right clicks to pull up a sub-menu. In this manner, general and specific agronomic information can be provided. As shown in FIG. 3a, clicking on the farm agronomics sub-menu button may lead the user to a more general farm agronomics form (52).

Figure 7A:
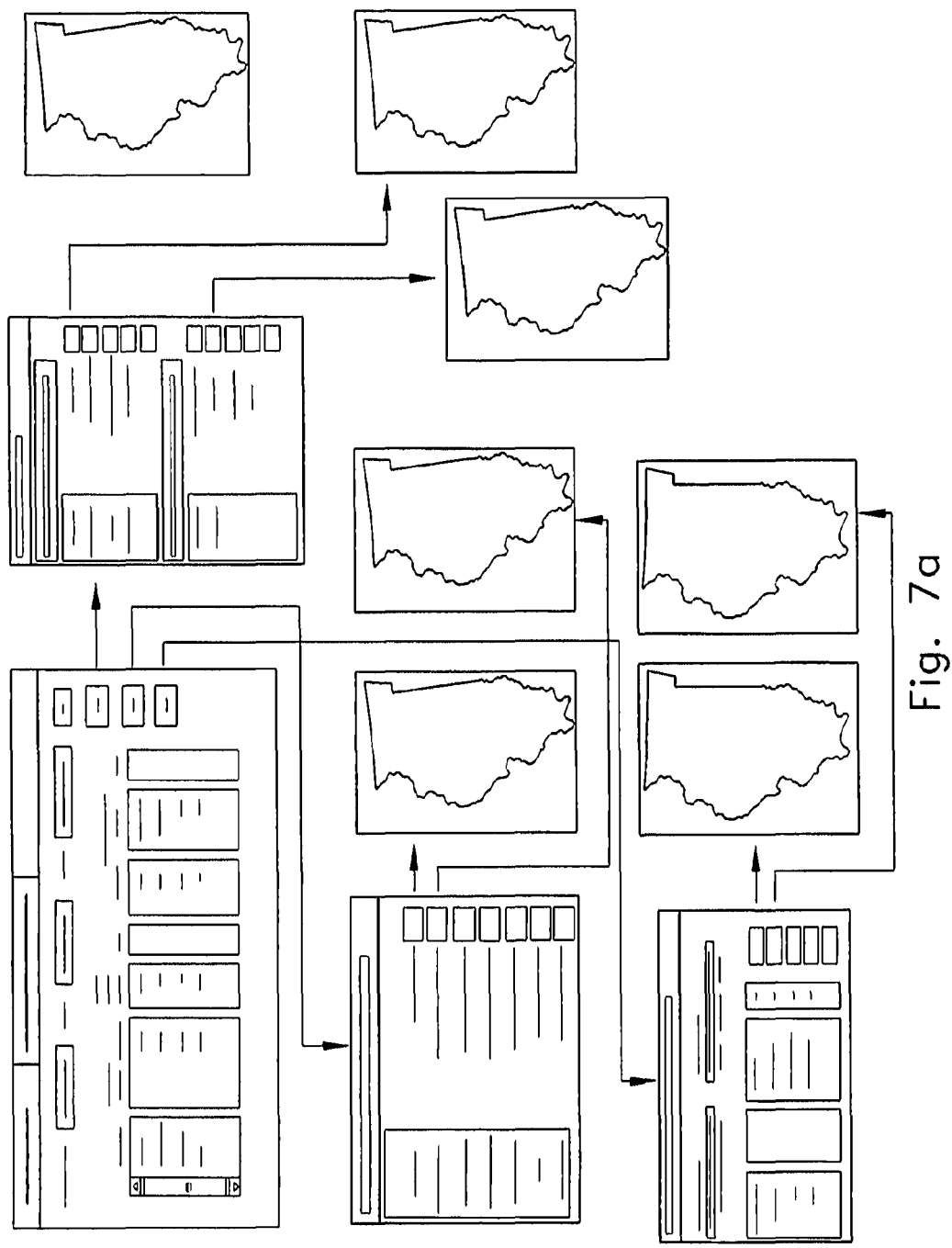
FIG. 7a is a click flow diagram of another click flow diagram.
Figure 7B:
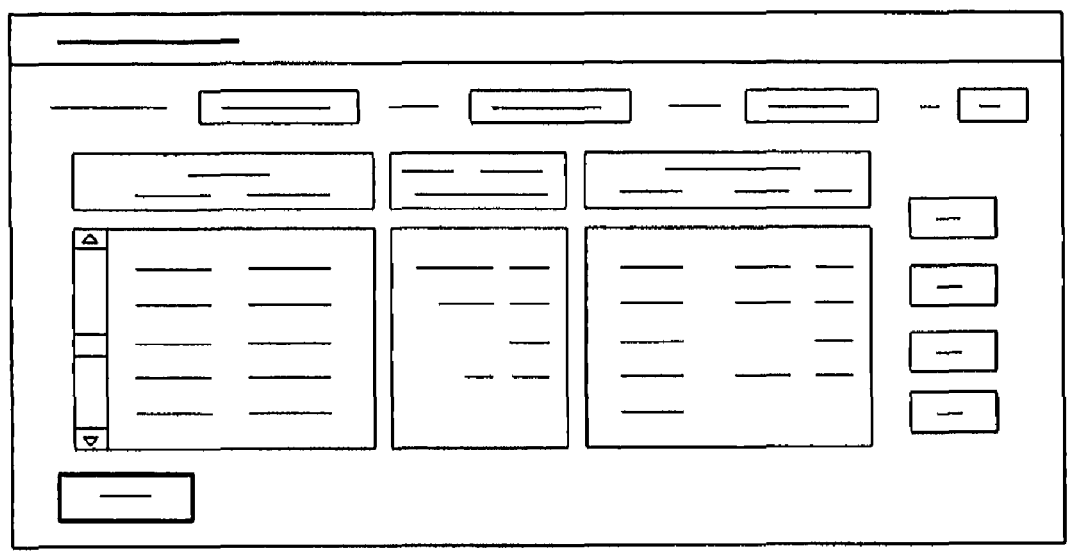
Figure 7C:
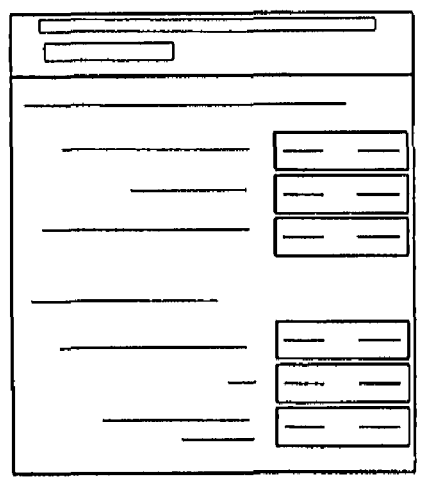
Figure 7D:
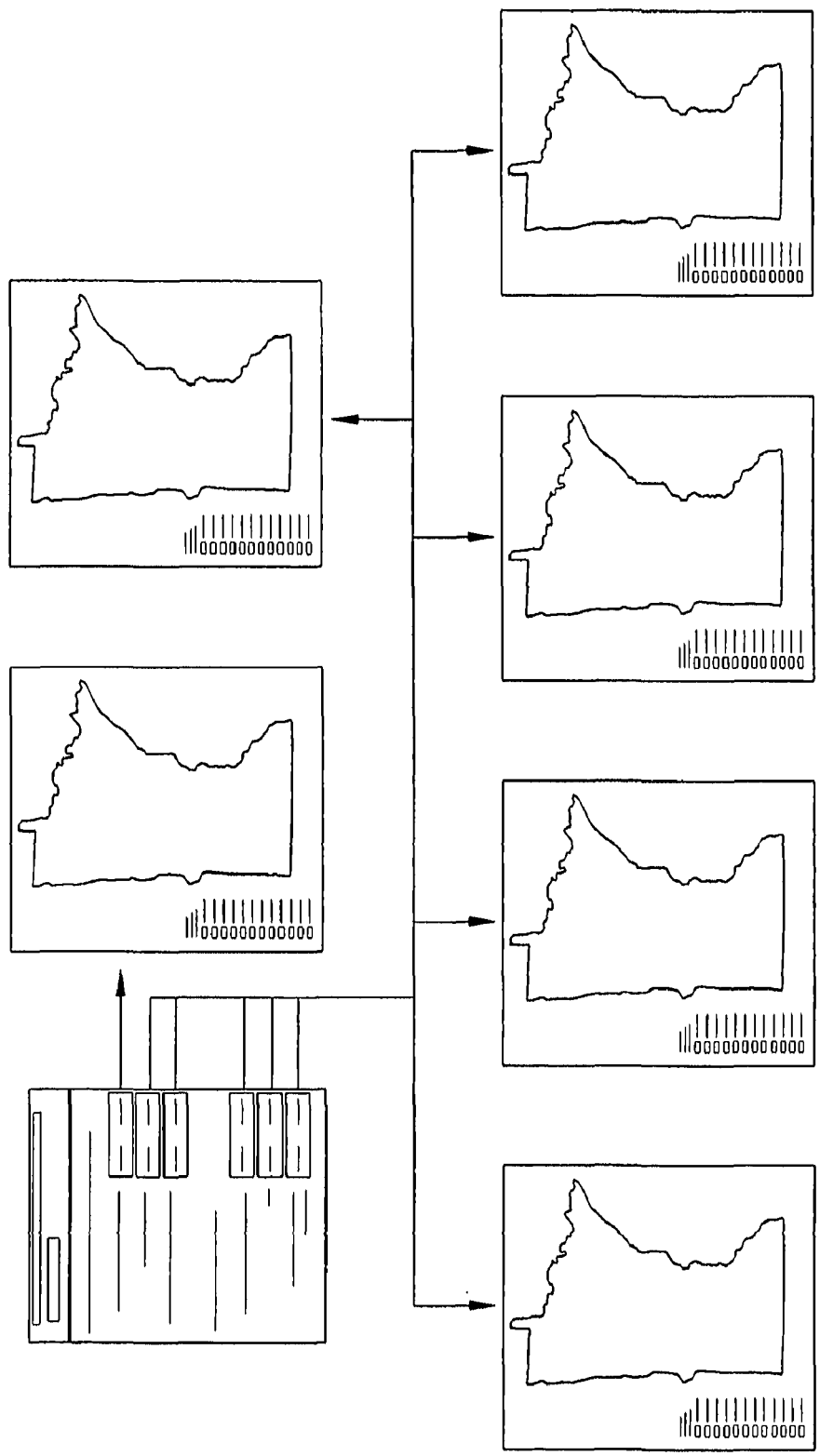
Figure 7E:
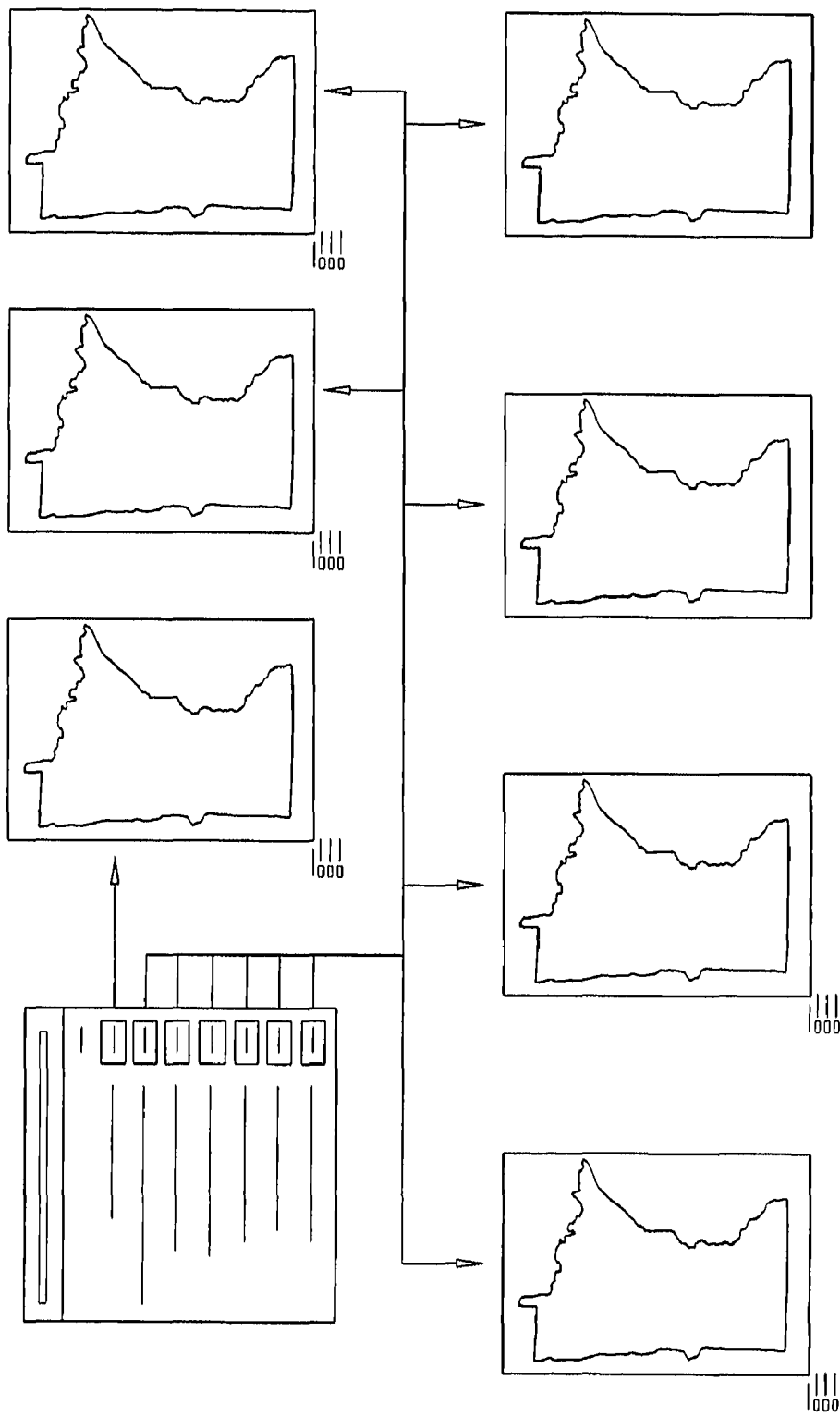
Figure 7F:
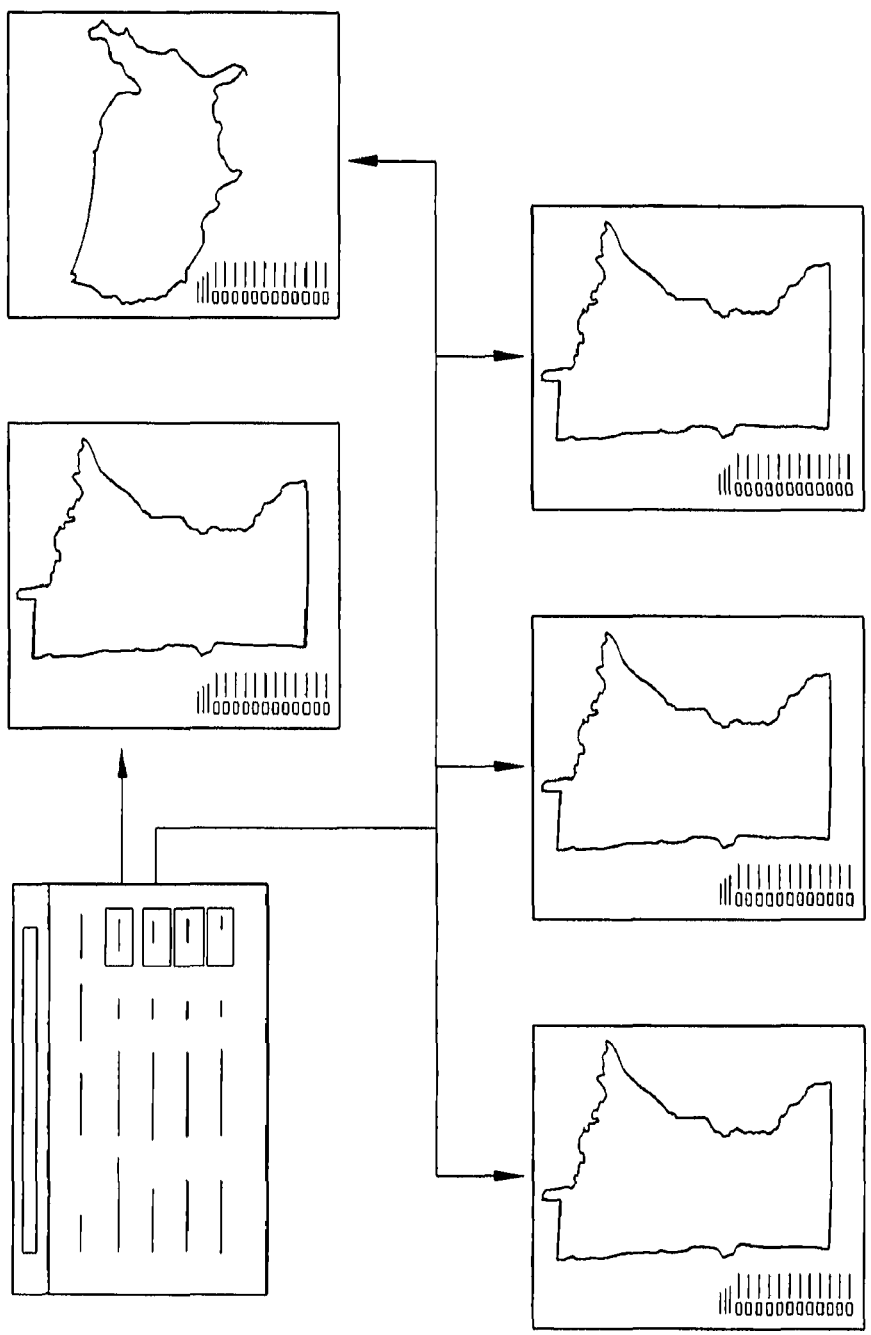
Figure 7G:
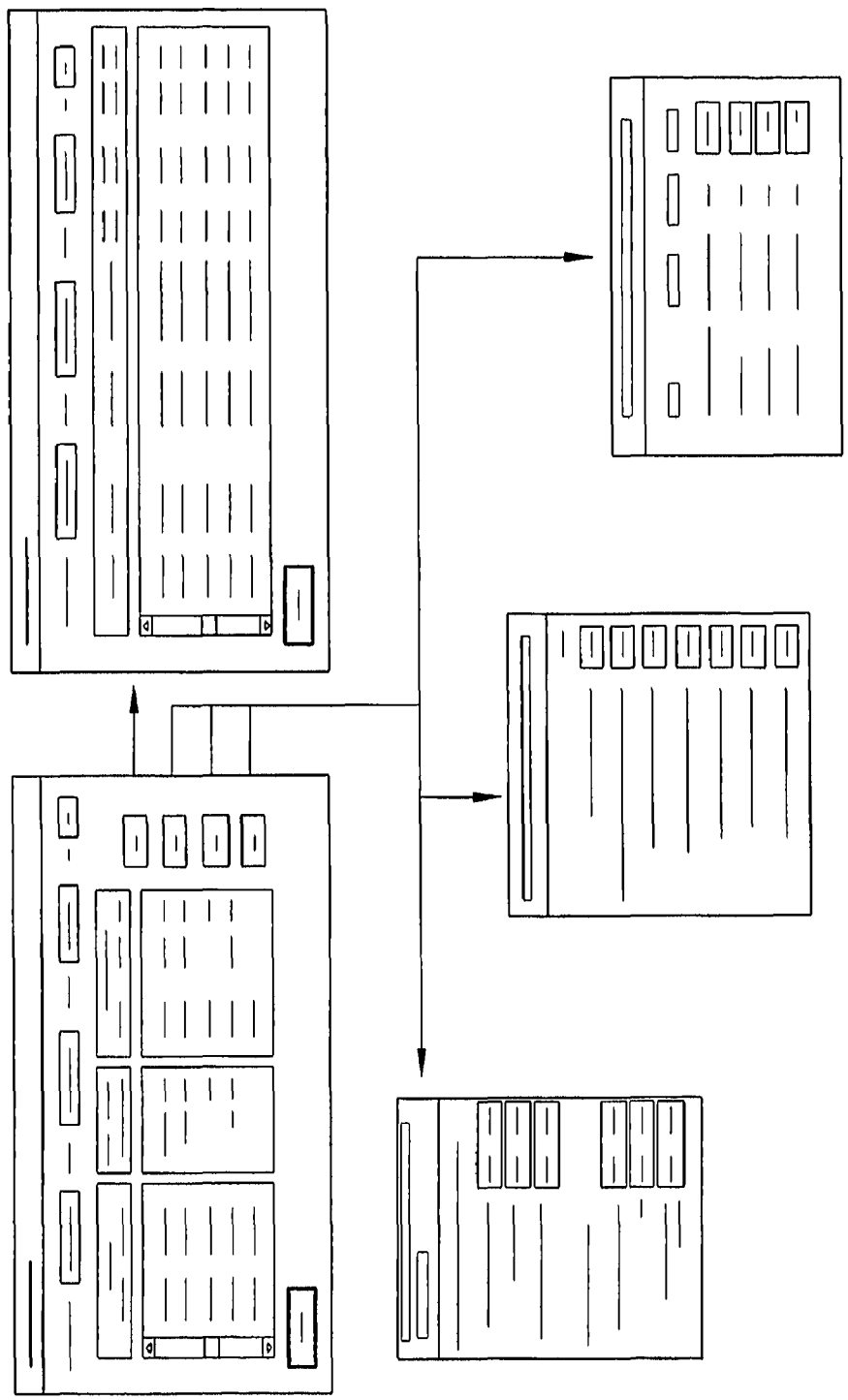
Figure 7H:
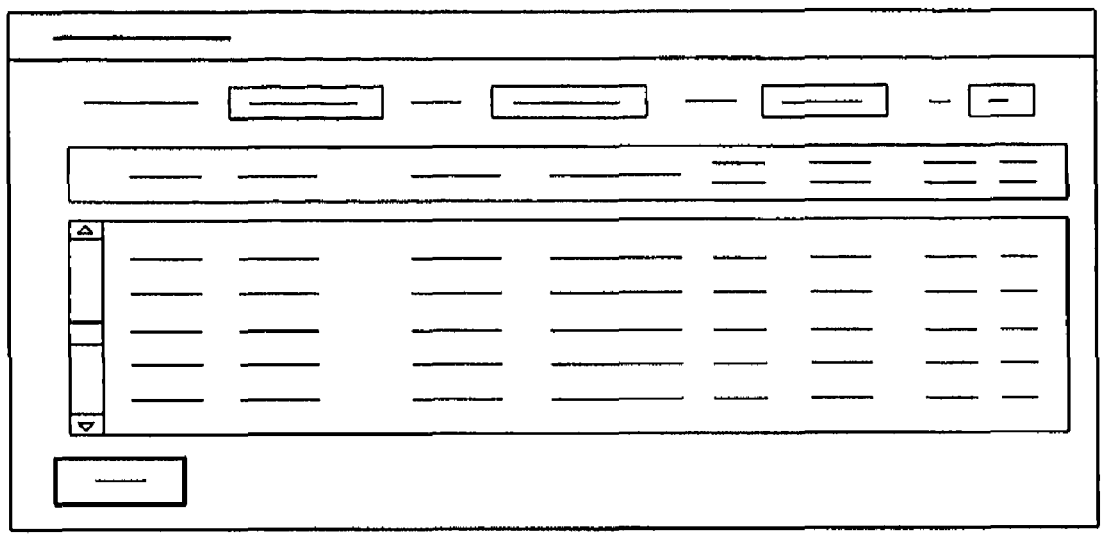
FIG. 7h is a blow-up of the actual production history item portion of FIG. 7g.
Figure 7I:
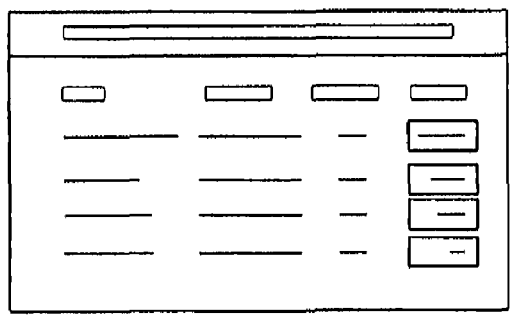

Types of agronomics form (52) and information are depicted in FIGS. 7a, 7b, and 7g. An agronomics form can provide access to general information that may be of use in understanding the specific entity under study. Multiple map displays as well as multiple zone displays are possible, of course. As shown, in the type of display indicated in FIG. 7b, general and specific production yields can be provided to permit comparison and analysis of the particular entity indicated. This can lead, perhaps through the various click-flows indicated, to soils information and physical characteristics information indicated in FIGS. 7c and 7d with related mapped information. As shown, these can as varied as crop specific yields, jurisdictional indications, or even soils pH or the like. Similar click-flows can lead to climate information as indicated in FIG. 7e with maps ranging from, for example, precipitation information to growing degree days or the like.

Statistical information such as NASS yields can be clicked into as shown. Crop yields can be mapped and indicated as in FIG. 7f for various crops.

Figure 4:
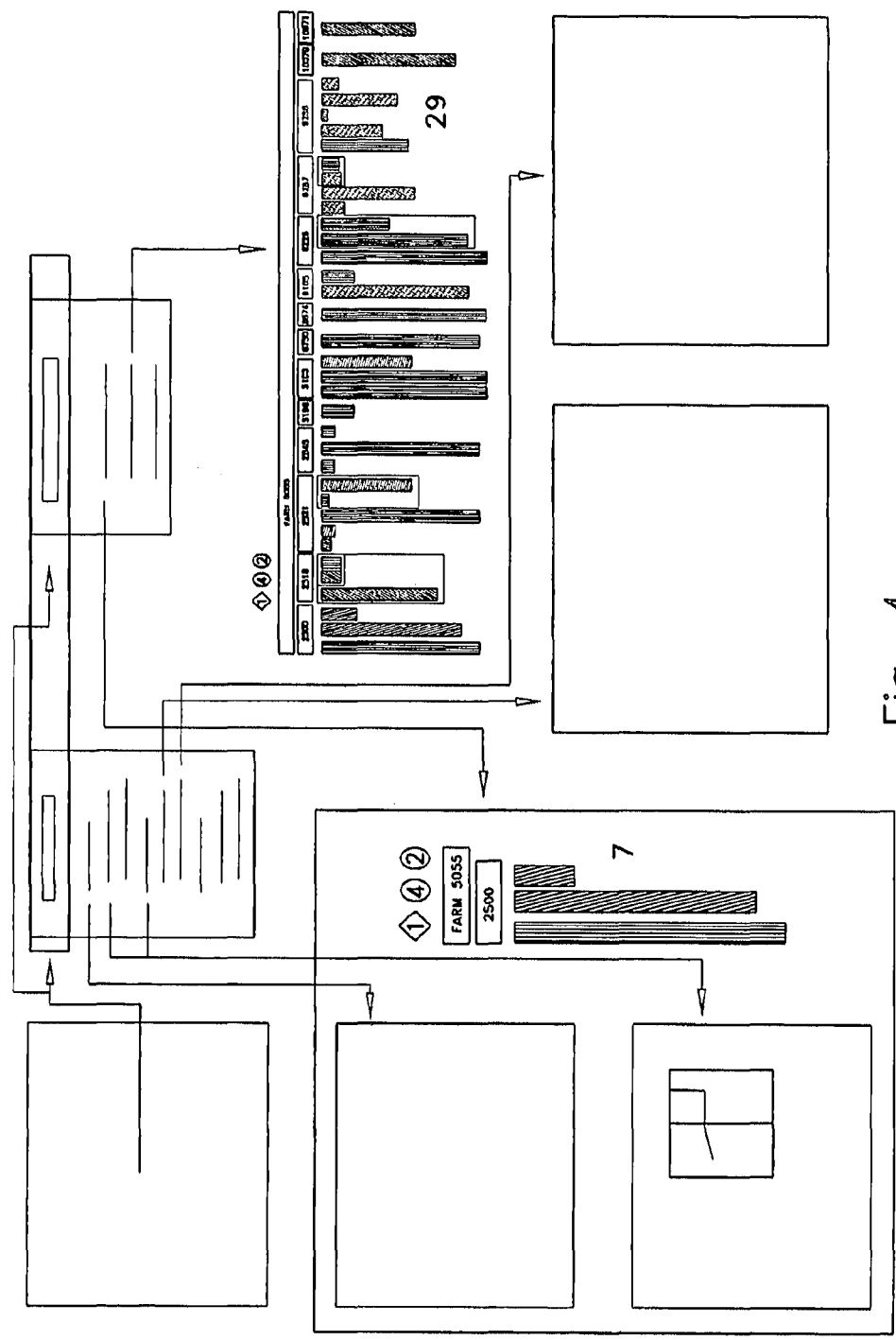
Figure 5A:
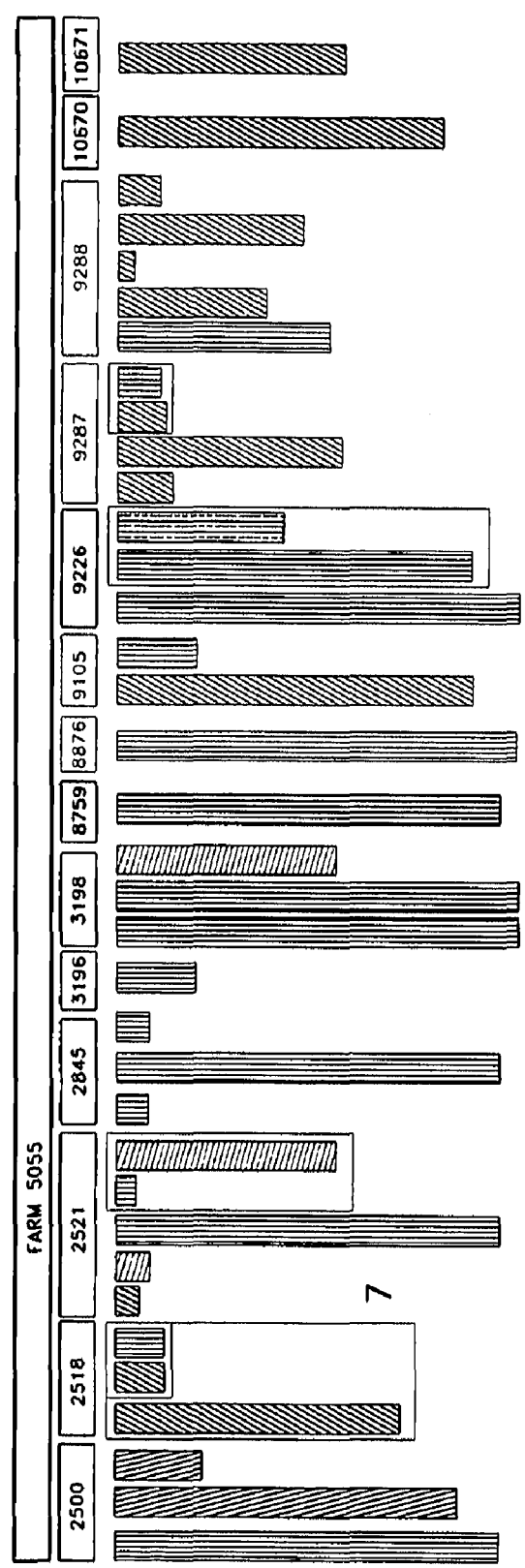
Figure 5B:
Figure 5B:
Figure 5B:
Figure 5B:
Figure 5B:
Figure 5B:
Figure 5B:
Figure 5B:

Referring again to FIG. 3a, it can be understood how a system according to the present invention can serve to congregate information that is relationally-linked. As shown in the hierarchical congregated information display (29), the system can serve to provide some type of presentation information on other entities that may be relationally-linked to the initial agronomic target (7). Although shown compressed for illustrative purposes, the hierarchical congregated information display can contains information on a variety of different farms and different parcels for which there is some type of relational link. In FIGS. 5a and 5b a more expanded (but more limited) hierarchical congregated information display (29) is shown. As this figure indicates or otherwise should be understood, many different farms and many different parcels and many different fields may actually have some type of relational link. Relationships may be depicted by assembling data in a congregated depiction so that the user can immediately understand the relationship possibilities. In the hierarchy, ownership, management, or other information can be indicated as a top hierarchy or omitted entirely. In addition, as shown in FIGS. 3a and 4, the hierarchical congregated information display (29) can be linked to precise item displays such as the grower form (46) or a farm land use form and the like as shown. These can even provide immediate in and out of such detailed information without a total reset of the initial agronomic target (7). As illustrated by the variations shown in the above figures, differing displays can be accommodated based upon a user's preference or needs.

In such a display, components that have actual precise boundaries may be separately depicted from components for which boundaries, or other information may have been imputed from the information source(s) used. As but one example, this is shown in FIG. 5 where some tract displays or the like have a lighter or outlined depiction. A lighter depiction may be used to show a lack of confirmational data or an unavailability of separate or perhaps independent data (perhaps such as a satellite image or the like) from which to make a comparison. As such, the system may effectively include an unavailability comparator (34) and may serve to assess the reliability of the information indicated. Such an unavailability comparator (34) may be programming, instructions, or a subroutine within a microprocessor or the like and so this is depicted as an internal component in the relationally-linked agronomic search processor (2) as shown in FIGS. 1 and 2.

Similarly, embodiments of the invention can act to identify if inconsistencies are possibly present among the existing, separate, or perhaps even independent datasets or database(s). As such, the system may effectively include an inconsistency comparator (33). Such an inconsistency comparator (33) may be programming or a subroutine within a microprocessor or the like and so this is also depicted as an internal component in the relationally-linked agronomic search processor (2) as shown in FIGS. 1 and 2. In instances where there is multiple crop usage for one field or in which boundaries cannot be reliably identified (such as when one-half is indicated as a particular usage, but that half's location is not indicated), boundaries may be imputed and generated. In such embodiments of the invention the system may itself generate a data estimate or an estimated map depiction. In but one example, this may be indicated by outlining the field information in various displays. As such, the system may effectively include an imputed boundary generator (35). Such an imputed boundary generator (35) may be programming or a subroutine within a microprocessor or the like and so this is also depicted as an internal component in the relationally-linked agronomic search processor (2) as shown in FIGS. 1 and 2.

Of course, the nature of the use of the land can be shown with immediate visual appeal. For instance, different types of crops can be color-coded so that an immediate conclusion can be reached as to what type of crop is generally grown. Other uses, such as land in the conservation resource management program can be depicted as well.

In providing its information, the system can be configured so that each or at least some of the displays are dynamic link displays (8). By this it is meant that by clicking or somehow indicating or selecting an item in one display the entire process can be reset and information can be accessed in an altered, more general, or even more specific levels of information can be provided. This can be provided at the display or even output level, the latter being considered as providing a dynamic link agronomic output (6) as any output that includes, in any feature, a dynamic link. For instance, in FIG. 5 by simply clicking on one of the farm numbers indicated, information relative to that farm can be provided. Similarly, by clicking on a parcel or tract number, other more specific information can be provided. The entire process (e.g., search, etc.) can even be reinstituted based on that specific entity or target. In this fashion the system can be configured to provide a variety of different displays. As it may relate to real land-use information, the system can be configured to provide a dynamic link real land use information display.

More generally, embodiments may be configured to provide a dynamic link real information display. By the term "real", the information provided may be actual precise information on a particular entity or target. This may be displayed in a real or imaged fashion such as in a satellite image or the like. In this regard, the system can be considered as providing a dynamic link real information display (9) or even a dynamic link satellite information display (10).

Virtual information can also be displayed. When configured as including a dynamic link virtual information display, the system can display information that generates an image, which is merely gleaned from the collection of database information available or that is merely not an imaged display. It may also include information that is precisely determinable from the database information and for which a new, or perhaps composite or graphic display is created. Naturally, this virtual information can focus on some aspect of land use and thus the system can present a dynamic link virtual land use information display (11). When that land information is obtained from or includes public land record information, the system can be configured to provide a dynamic link public land record information display. More generally, the system can include a dynamic link ownership information display (12), a dynamic link composite ownership information display (13), a dynamic link tenure information display, a dynamic link land use information display, a dynamic link composite land use information display, a dynamic link land management information display, a dynamic link composite land management information display, a dynamic link farm identification information display (14), a dynamic link physically aggregated parcel information display (15), a dynamic link physically aggregated parcel component information display, and even a dynamic link land-based locational information display, or whereby geospatial, boundary, address, or other locational information can be included.

Displays can also include precise information relative to specific uses of land. These can include broadly considered livestock information, as well as broadly considered crop information. Thus, a variety of dynamic link displays are possible, such as dynamic links based upon livestock information, crop planting information, crop harvest information, crop growth information, and even field information such as for the dynamic link field information display (16). Naturally, such as to provide more detailed information or the like, each of the above can include displays of tabular data. These tabular displays can also be configured to serve as a dynamic link, and thus the system can be considered as including a dynamic link tabular land use information display (17).

Referring to FIG. 4, it can be understood how different GIS and geospatial map displays can be integrated into one embodiment of the system. In order to facilitate identification of an initial agronomic target (7), some selection capability can be provided. In FIG. 4, this embodiment depicts a boundary highlighted display (53). The user may use the boundary highlighted display (53) to select a single parcel. This parcel may then be displayed in a selectable pull down menu, such as the RFarm/VFarm display (54). This display and its dropdown menus may permit selection of various different displays as indicated by the click flow arrows shown. For instance, by selecting the RFarm portion, the user may be able to show tracts, crops, and other aspects in a zoomable display. This zoomable display may be a multiple simultaneous zoomed geo-spatial agronomic image display (42) as indicated in FIG. 4. Such displays can be selected and indicated with overlay information at various levels. Maps of roads, cities, water and other basic layers, as well as geo-referenced grower locations and farm field boundaries can be used. Further, in embodiments a change in scale or other effect can be effected (zoom in or out or panning). Visibility and/or styling of the various map layers may automatically change as appropriate for the scale. The RFarm/Farm menu display (54) can provide access to the various functions, Data may be accessed through the menu interface or by clicking on various map objects using one of the map tools.

An important aspect of the invention can be its ability to identify relationships among various farms or entities. This is illustrated in one embodiment in FIG. 3*a* (and in FIG. 5) when the initial selection may be made such as from the grower form (46). As shown, this can yield a display of congregated information. This display may be a display such as the hierarchical congregated information display (29) shown. This display may also be configured as a dynamic link display (8). Regardless of how displayed, the result of the action of the relationally-linked agronomic search processor (2) or the like may yield congregated information, whereby the initial agronomic target (7) is merely an initial item that causes the assemblage and display of a collection of informational results. This collection of information may be such as shown in the hierarchical congregated information display (29). This congregation can include information on various farms, various parcels, or the like. It may even show instantly the existence of some type of relation between various items. In accomplishing its search functions, the relationally-linked agronomic search processor (2) or the computer can be configured to identify various types of relations, to filter relations, and even to develop information.

Relations can be, of course, based upon ownership, management, sales environment, equipment aspects, crop usage, crop practices, natural resource, know-how resources, intelligence resources, or a myriad of the other possible relational informations. Listing but a few of the types of configurations, it should be understood that the relationally-linked agronomic search processor (2), may actually represent a variety of different types of processors, including but not limited to, a farm management environment relationally-linked search processor, a sales environment relationally-linked search processor, an equipment usage environment relationally-linked search processor, an equipment need environment relationally-linked search processor, and even a crop usage environment relationally-linked search processor. It may also represent a land use environment relationally-linked search processor, a livestock environment relationally-linked search processor, a production input environment relationally-linked search processor, a production enhancement environment relationally-linked search processor, a crop enhancement environment relationally-linked search processor, a crop protection environment relationally-linked search processor, a pesticide use environment relationally-linked search processor, a financial services environment relationally-linked search processor, a bank lending services environment relationally-linked search processor, an insurance services environment relationally-linked search processor, an engineering services environment relationally-linked search processor, an irrigation services environment relationally-linked search processor, an agronomic consulting services environment relationally-linked search processor, a hybrid seed environment relationally-linked search processor, an equipment usage environment relationally-linked search processor, an equipment need environment relationally-linked search processor, and a crop usage environment relationally-linked search processor, to name but a few.

Perhaps useful in understanding is the possibility of considering application of an embodiment of the system in some user contexts. Imagining two different types of users and describing their background, experience, and what they might expect may be helpful. To do this, consider the following two user scenarios. First, consider a hypothetical person, Jim Greenjeans. Mr. Greenjeans can be considered as a hybrid seed salesman for a company hypothetically called FrankenCrops, Inc. FrankenCrops can be considered a commercial developer and supplier of advanced plant genetics to farmers throughout the world. Mr. Greenjeans may sell a product hypothetically called CeaserSoy seed to Illinois farmers (the soybean that conquers fields of wild waterhemp and ragweed transforming them into new soybean empires). Suppose Mr. Greenjeans has just been assigned the job of promoting FrankenCrops' new MirakleMaize brand of genetically enhanced corn throughout the Midwest. Mr. Greenjeans knows that there are not many fields that can't grow MirakleMaize but for this campaign to be another Greenjeans success, he needs to know who owns the fields throughout the Midwest where it will find its best growing conditions. These farmers will be his A-list of sales prospects. By using an embodiment of the present invention, Greenjeans can use this service's maps and reports to obtain the information he needs to target and ultimately convince farmers throughout the Midwest to plant their fields in FrankenCrops' MirakleMaize. Using an embodiment's web-based portal, Mr. Greenjeans can generate a list of growers and their contact information from all those with fields where optimum growing conditions intersect.

Similarly, one could consider another hypothetical user, Diane (Di) Cotel Edan. Ms. Edan could be considered as a chief market researcher for a hypothetical company called AgriKnowItAll LLC, an agricultural market research company. She may be responsible for producing maps and reports of farm market analyses for clients. She could use embodiments of the present invention to analyze regional markets for large clients like FrankenCrops and pesticide distributors like, say, Bugoff Corp. as well individual farm operations for lending institutions and crop insurance providers. She may even be an experienced GIS and database user, but still embodiments could produce for her real and virtual geographies of selected farming operations. She could find the system valuable not only for viewing and updating individual records, but for its graphic components to provide a visual dimension to the data that reveals information of farm structures and relationships not visible in a text-based interface.

Using the above two examples, it can be seen that the perspectives and needs of users can vary drastically. The system can be configured to default to locating information relevant to a particular criteria or a user may be able to select the desired criteria. In this latter instance, the system can be considered as utilizing user selectable criteria information. Thus, the system can have a selectable agronomic expansion criteria designator as one type of agronomic expansion criteria designator (43). This selectable agronomic expansion criteria designator can be configured within focused uses. For a salesperson, the criteria designator may be configured as a selectable sales territory expansion criteria designator, a selectable sales lead expansion criteria designator, or a selectable product need expansion criteria designator. More generally, it may be configured as a selectable agronomic expansion criteria designator, a land use expansion criteria designator, a land ownership criteria designator, a land characteristic criteria designator, or a land management criteria designator, to name a few.

Types of other configurations may include (but not be limited to) a land tenure criteria designator, a land use criteria designator, a farm identification criteria designator, a physically aggregated parcel criteria designator, a physically aggregated parcel component criteria designator, a land-based locational criteria designator, an acreage criteria designator, a field information criteria designator, a landscape criteria designator, and a geographic setting criteria designator. Family or other human relations can also be considered such as by configuring the system to serve as a human relations criteria designator or a habitation criteria designator (e.g., unrelated persons living together). Specific types of land uses can also be accommodated. In this arrangement, the system can serve as a production criteria designator, a soil criteria designator, a crop-soil association criteria designator, a landscape criteria designator, a geographic setting criteria designator, a crop usage criteria designator, a crop harvest criteria designator, a crop growth criteria designator, a crop type criteria designator, a crop practices criteria designator, a climate criteria designator, a land cover criteria designator.

The fact that relationships may vary over time, can also be included. As such a system can be considered as including a temporal criteria designator or even a historical land use information criteria designator, perhaps each representing different types of devices or programming that may consider historical changes and may relate information such as over several years or the like. A separate button for selected information can even be included such as may present information on an actual production history or the like. This information can even be established automatically or on command when another event or information is present such as when there is multiple peril crop insurance or the like for an entity.

In instances where particular activities, or perhaps even services are of interest, the system can be configured to permit designation of auxiliary information appropriate to the particular instance. Non-limiting examples of these can include when the system is configured as a crop protection criteria designator, a pesticide use criteria designator, a financial services criteria designator, a bank lending services criteria designator, a insurance services criteria designator, a engineering services criteria designator, a irrigation services criteria designator, an agronomic consulting services criteria designator, a hybrid seed criteria designator, an equipment usage criteria designator, an equipment purchase criteria designator, an apparent equipment usage criteria designator, or a farm credit usage criteria designator.

Where regulatory or other concerns are important, the system can be configured to consider the political governance or other such factors. Embodiments of the system can include or be configured as a political designation criteria designator or a political jurisdiction designator. Real and virtual aspects can be considered such as when configured as an apparent decision making criteria designator, a decision making criteria designator, or a geo-spatial criteria designator. Remotely sensed information can also be included and as such, the system can include a remote sensed information criteria designator. It may also provide information relative to neighboring lands or the like and can include a boundary criteria designator. Further farms and agronomic entities can be filtered so that only certain yields or other criteria are met. As such, the system can include a filter designator, a crop yield criteria designator, and even an agronomic production value criteria designator. Once again, permutations and combinations of all of the above can be included.

Figure 6:
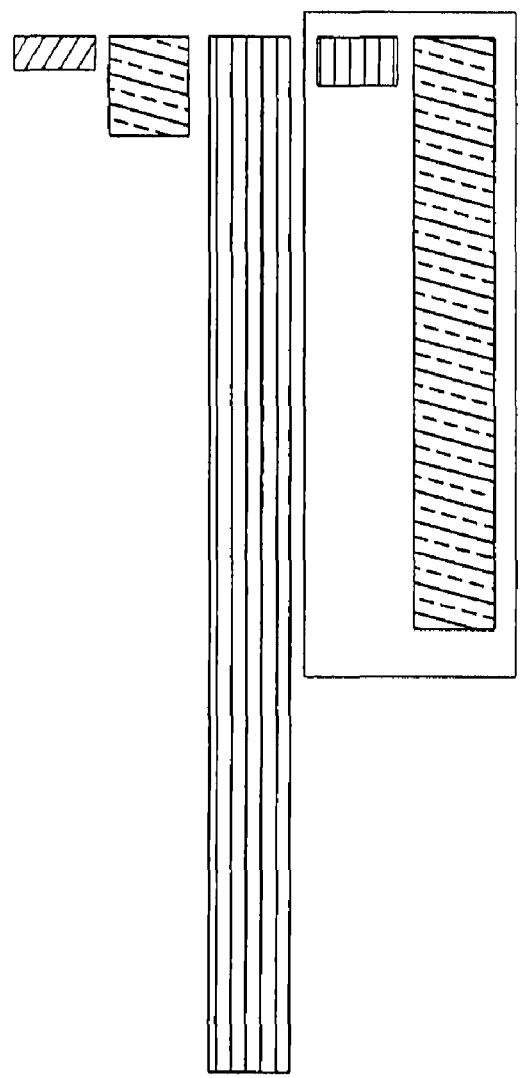

As mentioned earlier, virtual information can be generated or displayed. This virtual information can include virtual land use information. Generated, not precisely indicated, graphically displayed, and data inferred information can be shown. The system can be configured to permit viewing of virtual maps of farm operations. In one embodiment, these may include schematic views of farms, parcels, and fields and their associated growers in a clickable map window. This may include a graphic display for only the initial agronomic target (7) as indicated in FIG. 6 or for a congregated hierarchical congregated information display (29) as shown in FIG. 5*a*. Embodiments may also simultaneously display real and virtual land use information such as shown in FIGS. 3*a* and 4. A tool can be provided to select a grower from the basemap window and then can display an appropriate grower form, or the like. It can also display that entity's associated farm or, associated farm, tract or field in a map if desired.

Figure 3I:
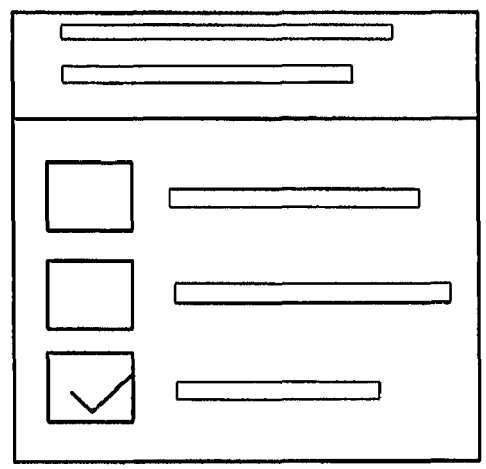
Figure 3J:
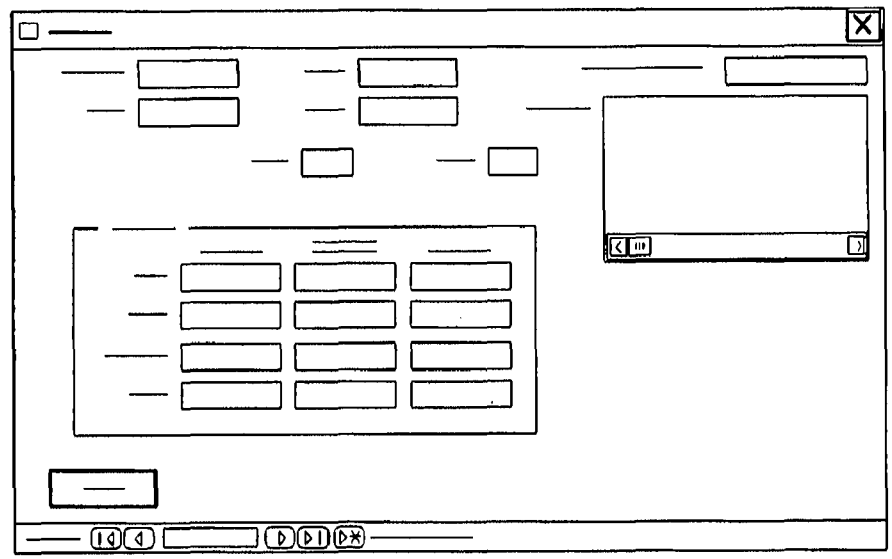

Summary information can be provided at many levels. As but one example, summary information can be farm summary information. As shown in FIGS. 3*a* and 3*i*, a farm summary form (51) can summarize cropland, land use and other information for component tracts and fields on a farm as well as a list growers associated with the operation. Thus the system can facilitate quickly understanding the complexity of an operation—especially for larger farms where there may be many tracts and fields. The virtual information aspects can be particularly useful to see relationships in this example. By providing a virtual representation of a farm with its member tracts and fields, user conclusions and inferences can be illustrated. Virtual representations can provide a virtual but quantitatively accurate picture of a farm, its component farm fields, its crop types, and perhaps even its manager's or owner's practices. Information relative to the structure of the farm as organized through tracts and fields and the institutional organization of the farm's management can also be shown. A virtual indication can act as an integrator of all the information connected to the physical location of the initial target or otherwise as perhaps represented on the landscape. The virtual information display can function as a counterpart to the physical farm or the real information.

As shown in FIGS. 4 and 7*a*, items such as fields in this instance, may be thematically mapped by crop type, conservation practice, or the like. Indications can be refined for visual effect such as by crop shading or with a pattern overlay. If the crop is double-cropped, fields can be vertically stacked with crop type color shades or the like. Fields, tract bars, and farm bars may be surrounded with a blue boundary to indicate that there is a corresponding farm field map or such. Where two or more fields add up to one physically aggregated parcel, multiple farm fields may be circumscribed such as with a single blue boundary showing that they are parts of a single parcel in some context. Other various are possible, of course.

Another aspect of the invention in some embodiments is that it can include simultaneous views of various information. Traditional data management systems often allow viewing of information only in the form of lists. Graphic views can be included as powerful ways to view farm and grower relationships. These views may be dynamic and interactive, and a user can select growers, farm tracts and fields from them to generate new views or display data in forms. Map views can be included to view data in its geographical or geospatial context. Such views can facilitate seeing spatial relationships between growers and farms. Embodiments can react to selections of these entities as well. For example, if a user were to locate a grower in a map, embodiments can make it a simple matter to select all neighboring growers with a circle selection tool, and then to view these records in the grower form or other aspects. The system can be configured to provide simultaneous real and virtual land use information data outputs. Information about yield rates for each crop type and practice on the farm can be provided. This information can even be as determined by the risk management agency for farms subscribing to multiple peril crop insurance.

As mentioned above with respect to the designators or environments involved, the types of agronomic information display can very widely. Information can range from land ownership information, land management information, land tenure information, land use information, land cover information, land-based locational information, geo-spatial information, land boundary information, to livestock information. Entry relative to specific entities or location candy included such as: farm identification information, physically aggregated parcel information, physically aggregated parcel component information, and more generally, parcel identification information. Also, generally, land characteristic information, acreage information, field information, acreage information, historical land use information, temporal information, political information, political jurisdiction information, and even climate information can be included.

Aspects of particular use may be of interest, and the agronomic information can include a wide variety of focused use information. Examples could include: pesticide use information, hybrid seed information, crop practices information, crop planting information, crop harvest information, crop growth information, soil information, crop-soil association information, crop information, conservation information, crop production information, crop yield information, and crop type information. Agronomic information of a purely commercial perspective can be included as well such as: apparent decision making information, equipment purchase information, apparent equipment usage information, farm credit usage information, and even production value information. Agronomic services information can range as before, including, but not limited to: financial services information, bank lending services information, insurance services information, engineering services information, irrigation services information, and agronomic consulting services information.

Summary agronomic information such as crop acres by practice and totals can be presented. Crop acres can also account for double-cropped croplands. Summary of conservation acres by practice and totals for the farm or other parcel can be presented. A total of farmland acres by practice and totals for the farm. Farmland acres can be the total acres of cropland, conservation acres and non-cropped areas such as turn areas and fallow land. Farmland may also include only those acres which are the base acres for double-cropped cropland.

As shown in FIGS. 3*a*, 4, and 5, information can be congregated. This can occur in a variety of ways. As shown in FIG. 3*a*, one type of congregation is the hierarchical congregated information display (29). By including at least some agronomic information or by presenting largely information of interest in a particular agronomic context, the system may be configured to include a hierarchical agronomic data output (19). The hierarchical agronomic data output (19) can be configured for each type of information involved. It may be configured to present a hierarchical land ownership information output, a hierarchical land management information output, a hierarchical land use information output (20), a hierarchical farm identification information output (21), a hierarchical physically aggregated parcel information output (22), a hierarchical land-based locational information output, a hierarchical field information output (23), a hierarchical acreage information output, a hierarchical crop information output (24), a hierarchical crop planting information output, a hierarchical crop harvest information output, a hierarchical crop growth information output, a hierarchical conservation information output (25), a hierarchical tenure information output, and even a hierarchical livestock information output to list but a few types of configurations possible. Displays can provide a count of farms with which the grower or other entity has an association. Such congregations can include summaries of major crop types. As shown, data can be congregated so that multiple tracts, and even multiple entities can be placed next to each other so that relationships can be seen. As shown, the hierarchical congregated information display (29) may include information on the initial agronomic target (7). The display can be hierarchical such that information (perhaps ownership or land use information) can be displayed at a higher level. As shown in the embodiments of FIGS. 3*a* and 5, the original owner or other relationship can be indicated such as with a diamond and related owners or other relations can be shown, circled. These can also be color-coded and numerically coded to provide additional information. Farm numbers can be in a level below owner indications and tract numbers can be displayed below the farm numbers. This can culminate in a graphic display, which shows acreage and type of crop information. Embodiments can congregate at least some information on both an initial agronomic target (7) one or more additional, relationally-linked agronomic entities.

The information congregated, generated, or perhaps created can be meta-syntactic. By this, information may not even reside precisely in a singular database or may be inferred, generated, or imputed. As such, the system can be considered as creating meta-syntactic agronomic information and can be considered as having a meta-syntactic agronomic information generator (31). The meta-syntactic agronomic information generator (31), can conduct a multiple agronomic information database comparison. It can act to create information by comparing information and different databases. In one regard, the system can accomplish a comparative inconsistency check. It can accomplish this by locating inconsistencies between databases and even indicating generally that such information provided may be subject to some uncertainty. In this fashion, the system can be considered as having and inconsistency comparator (33). Comparisons can also be made among multiple databases, on singular databases, or otherwise to indicate unavailability of information normally expected to exist. Thus the system can accomplish a comparative unavailability check and can be considered as having a unavailability comparator (34). Even when information is not precisely available, the system can act such as by imputing a boundary or the like. It can thus have an imputed boundary generator (35). Each of these can occur with database information, and even by comparison and use of multiple agronomic information databases. Thus, the system can be responsive to multiple databases. This can be particularly important because crop types, farm field configurations and tract compositions as well as tract names can change year by year. A virtual map or display can show which items can be currently mapped to a real display and which ones are imputed or may even need to be updated such as by light shading as shown for tracts 9287 and 9288 in FIGS. 3a, 4, and 5.

In the type of hierarchical congregated information display shown, additional indications, and even dynamic links can be provided as well. Thus, the multiple agronomic entity data accumulator (4) can be configured to congregate land ownership information, land management information, land use information, farm identification information, and even physically aggregated parcel information as shown. Information may be current for the crop year specified or for some default. This can even be included when farms, tracts and perhaps even field digitized boundaries may be obtained and digitized in years that differ from the current production year such as when the current year information may not be available or for other reasons. Non-mapping farms, tracts, or fields may be shown as grayed out rectangles in a mappable display, and mappable farm fields, tracts and/or farms may be surrounded by a bright blue boundary or other appropriate indication. Where multiple farm fields constitute a mappable parcel, a blue box may be included to surround the component farm fields or some other indication can be used.

Not only can non-precise information be used or generated, but the system can be configured to conduct a search for non-exact similarity-based linkage information. By this it is meant that the system may find information from which it can deduce a relationship even though the relationship is not precisely indicated. The system may include a geo-spatially linked information search processor configured to compare information, a temporal linked information search processor (37) configured to compare information, a change information search processor configured to compare information, a listed person involvement information search processor (38) configured to compare information, and. more generally, a non-exact similarity-based linkage information search processor (39) as the relationally-linked agronomic search processor (2). Such in information can be gleaned by utilizing multiple databases such as by comparing geospatial information with land record information, by comparing crop records with satellite information, and even by comparing farm credit information with name identifications to name but a few.

A variety of commonalities, not only exactitudes, can be used by embodiments. As such the system can be considered as having a commonality search configured processor (30) configured to compare information, configured to compare ownership information, configured to ascertain at least some commonality information, configured to deduce commonality land ownership information, commonality land management information, commonality land tenure information, commonality land use information, commonality land cover information, commonality livestock information, and the like for the entire scope of the various range of agronomic informations mentioned above. Each of these broadly described commonalities can even be between the initial agronomic target and any one or more of the additional, relationally-linked agronomic entities. Thus the system can be considered as having a specified type of search processor, a specified type of search configured processor, and a specified type of information comparator.

As mentioned above, the system can be configured to find non-exact search information. It can also be configured to locate inductively linked information. Embodiments can be considered as having an inductively linked information search processor as the relationally-linked agronomic search processor (2). Naturally this inductively linked information search processor can be considered by its configuration and programming as a particular type of search processor. As an initial example only, the inductively linked information search processor can be considered as an inductively linked crop type information search processor or the like. Again, each type of agronomic information and can be considered as establishing a different type of search processor.

The type of comparisons that can be made can be based upon the general concept of fuzzy logic. This is not meant to constrain to a particular type of algorithmic calculation, but rather in its most general sense to indicate broader than precise identicality comparisons. With this understanding, the embodiments can act to provide a fuzzy logic data similarity comparison. Such a comparison can be made by a fuzzy logic information search processor (40). Again, the fuzzy logic information search processor (40) can be a specific configuration of the relationally-linked agronomic search processor (2). Yet again, a variety of fuzzy logic information search processors can be provided with each having the particular programming or configuration set by the type of agronomic information involved. Once more, permutations and combinations of all of the above can be provided as well.

In some embodiments, there are several ways to access grower or farm records and several ways to present them. In one embodiment, any grower, farm, tract, and field record in the database can viewed and edited via a form interface. Users can also access related information from each form as well, such as by reaching a field by linking from a grower to a tract to the field or vice-versa. In other or the same embodiment, users can access records from selections made in map or in virtual information views. Each of these views can be dynamic and can provide for a resettable initial agronomic target, and automatically resettable item, and even a reset of an item in response to a reset of another item. Such reset capabilities can be provided by a simplified user action reset, such as by clicking on an entity, display, tabular data, or other item.

As mentioned above in reference to FIG. 3a, a hierarchical display can aid in indicating relationships and structures not always readily apparent. FIG. 5 shows a hierarchical congregated display with ownership information omitted. The ownership information is indicated in FIG. 3a for the initial agronomic target (7), and for the hierarchical congregated information display (29). As mentioned earlier, the ownership information can be coded to indicate the initial original information as well as related information and color relations as well. This can be shown along the top of the display to indicate the various ties. Referring to FIG. 5, it can be seen that farm and parcel information can be the next sequence of hierarchies. Farm information can be provided with farm numbers to permit appropriate understanding. Similarly, different parcels, and even tracts can be showered with different numbers as well. Below the farm information, field information can be shown quantitatively and/or graphically. This can be superior to a display of field information such as actual acreage, actual crops, color coding of crops, and bar coding of acreage as indicated. The display can include geo-spatial bar graph information, color coded geo-spatial information, and even both color coded geo-spatial bar graph information as but some examples.

Further, coding to indicate deduced data, combined data, and even other usages such as conservation land use or livestock usage can be shown. By providing at least some hierarchical information, the system can aid in understanding. This understanding can be further enhanced by simultaneously hierarchically displaying at least some real and at least some virtual information. As indicated in FIG. 3a and others real information can be shown such as a satellite image, with virtual information shown at the field level for an initial agronomic target (7). In addition, congregated information can be shown as indicated in the hierarchical congregated information display (29). This information can be superimposed or can be separately provided for its own display such as is shown in FIG. 5. In its most general sense, the system can provide a hierarchical land ownership information output, which may be both simultaneous and separate with both real and virtual information outputs. Naturally, all of this output can be related to land information or even land ownership information at some level and as such, the system can provide a hierarchical land use information output. This hierarchical information output can be a hierarchical land management information output, a hierarchical tenure information output, a hierarchical livestock information output, a hierarchical farm identification information output, a hierarchical physically aggregated parcel information output, a hierarchical land-based locational information output, a hierarchical crop planting information output, a hierarchical crop harvest information output, a hierarchical crop growth information output, a hierarchical congregated land tenure information display, a hierarchical acreage information output, a hierarchical field information output, a hierarchical acreage information output, a hierarchical crop information output, a hierarchical conservation information output, a hierarchical geo-spatial bar graph information output, a hierarchical color coded geo-spatial information output, a hierarchical color coded geo-spatial bar graph information output, a hierarchical congregated land ownership information display, a hierarchical congregated land management information display, a hierarchical congregated land use information display, a hierarchical congregated farm identification information display, a hierarchical congregated physically aggregated parcel or perhaps component information display, a hierarchical congregated land-based locational information display, a hierarchical congregated acreage information display, a hierarchical congregated field information display, or other types of outputs or displays. Naturally it should be understood that any type of output is possible in the output may be a display or vice versa.

Embodiments on the system can be configured to even predict success in various applications. While information can be provided that allows a user to estimate or deduce the likelihood of success in a certain instance (such as in sales of equipment or the like), other embodiments can be more overt. These embodiments can be configured to link data on other usages of services, or other activities so that conclusions can be reached more directly. This can include the various services mentioned earlier, historical or temporal information, previous pesticide or other use information, and the like.

Negative, unintended impact, or protective information and modeling can also be provided such as in instances where pesticides or genetically modified organisms (GMO's) might move or migrate such as through watersheds, wind patterns, transportation events, and the like. The system can be configured to understand the impacts that particular types of seeds or other products, such as GMO seeds, might experience. Success can also be predicted. By understanding resources available, including but not limited to input resources but also expanded to it intelligence resources, know-how resources, competencies, and even crop management practices, outcomes can be predicted with varying degrees of success. Calculation algorithms and factors may be weighted, if appropriate. The system can act by identifying agronomic expansion criteria correlated with an appropriate entity or an appropriate environment and can not only serve to search within an agronomic expansion criteria for interaction environment auxiliary information, but it and also act to reach conclusions and recommend some actions.

By acting to correlate information, the system can show relationships that may not even have been a readily apparent without such correlation. It can be configured to generate interaction environment auxiliary information and can act with respect to multiple entities and the information provided. As such, the system may be considered as having a multiple agronomic entity data correlation processor (44). In regards to the specific applications considered, it can also be considered as having a predefined agronomic expansion criteria designator. With respect to specific farms or tracts, it can be considered as having a farm identification expansion criteria designator, a physically aggregated parcel or even parcel component expansion criteria designator, among other configurations.

As mentioned earlier, a great variety of different databases can be used and accessed by the system. Interfaces can include producer and integrated geography data bases to help users to interact with data. In the agricultural context, data providing a large amount of information, such as 2.0 million growers, 2.3 million farms, 4.0 million tracts and/or 17 million farm fields can be used interactively and can be graphically or visually represented. This can provide an understanding of farm structure at the farm and field level in a manner that has not been practically available. The system can access multiple gigabytes of national data. Interfaces can describe a farm's (or other target product's) structure, size, organization, management, and owner/operator network. Further, products secondarily managed or otherwise appropriately involved through those owners or operators can be integrated and analyzed with a myriad of inputs such as production, history, characteristics, landscapes, and even geographical settings perhaps including, but not limited to soils, terrain, land cover type and even climate including any key production-related climate variables such as growing degree days, precipitation, temperature, last and first frost dates, freeze-free days, etc. perhaps as either average over 40 years or as last or as this year's accumulated data for modeling the current production year.

The system can be configured as a hybrid of DBMS and GIS software driven by both text-based and geographic databases. It can be modular in design and can allow for interchanging its major components in the future. Structurally, the various components can be integrated through a defined, open protocol which may even allow future development or incorporation of alternate components to serve a wider market. For example, the farm data interface can be driven by a local database perhaps with tables that are actually just links to other tables which may be local or not. This can allow embodiments to use a common database interface, yet still connect to any one of multiple physical databases. A user may be able to choose datasets available for connection. A great variety of databases and information can be used. These could include, but not be limited to: soils database or information, environmental database or information, climate database or information, land cover database or information, aerial photography database or information, satellite database or information, topographic database or information, transportation network database or information, hydrography database or information, jurisdictional boundary database or information, zip code database or information, population center database or information, synthesized geo-spatial database or information, geo-physical temporal database or information, regulated geography database or information, life style or social demographic database or information, or a client proprietary database or information.

The system can be configured to accomplish various high-level tasks. Tasks may be identified by scenario descriptions. For example, to produce a "Daily Market Map" a user might be able to select "Create Daily Market Map" from some menu. He or she might then select the market area, use tools to add customers, set up buffer rings, etc. This could then be sent to a queue for printing or otherwise displayed. High-level tasks might include the success prediction functions mentioned earlier as well as sales and commercial functions. The system can link to or include a proprietary sales information database to aid sales people in their tasks. These databases could include equipment purchase information, apparent equipment usage information, and even commercially inductive information. This inductive information, can be inductive sales territory information which can be information as to any of the various types of agronomic information set out herein as well as other agronomic information. The inductive sales lead information can permit or be prioritized sales information, and inductive product need information. Each of these can arise as a result of particular user selectable criteria information perhaps even including selected sales territory information, selected sales lead information, selected product need information, or the like. Estimates can be made, and inductive information generated by using particular algorithms as appropriate to an application.

In one example, an embodiment of the system can be configured to calculate a ratio of Approved Yield Rate/t-Yield Rate. It can provide an estimate of relative productivity of one farm compared with others in the immediate sub-county area to which the farm belongs and for which the base t-Yield is determined by published actuarial tables or otherwise. Such a value could be used to calculate total yields for each crop type and practice. Where there are two or more different units for one crop type and practice, an average of approved yield rates could be used to calculate production. Embodiments can provide estimates of the yields of each crop type on a farm as based upon farm-specific crop yield rates or, if farm-specific yield rates are not available, through regional average yield rates within a sub-county region where the farm is located. Choices can be presented for selecting the actual production history data for the farm, if it is available, with relative yield rates for crops grown compared to the local area, and descriptions of the agronomic (landscape—soils and climate—and production) setting of the county in which the farm is located.

Economic use of the system also be provided for, such as by providing agronomic data access on a fee basis established by the amount of data available. The fee basis can be varied to suit the application involved. The overall agronomic dataset size can determine pricing, the number of geo-spatial locations accessed can determine pricing, the political division involved can determine pricing, or the like. Numbers of units accessed can do the same. For example, the number of initial agronomic targets accessed and the number of additional, relationally-linked agronomic entities shown can set pricing. Of course, more traditional aspects such as calendar-based pricing or the like can be provided. This can all be established automatically such as by configuring the microprocessor or in other programmed capability to act as a fee-based access controller (36). This fee-based access controller (36) be configured as a variety of access controllers such as an overall agronomic dataset size-based access controller, a number of geo-spatial locations accessed-based access controller, a political division-based access controller, a number of initial agronomic targets accessed-based access controller, a number of additional, relationally-linked agronomic entity accessed-based access controller, and a calendar-based access controller, just to name a few.

In embodiments, linking actual farm field (or other target product) boundaries or the like can be accomplished with existing or other customer data sets. This may be accomplished in a visual structure. Embodiments may also tie the target product and its operators to actual/physical landscapes at the field level. Virtual mapping displaying all the farms associated with the grower in the specified year can be provided. A locator map (50) can be provided to present a regional perspective of the location of a farm or parcel. With agronomic climate, soils and production maps, a visual description of the physiographic setting of the farm can be made available such as indicated in FIG. 7a. An index map can be provided to display the counties for the state in which the target is located. The county in which the target is located may also be highlighted. Through embodiments of the invention it may be possible to tie information such as (in but one example) 150 or even 400 million acres of cropland to a visual structure. The system can also be configured to accept heads-up or perhaps web-based digitizing, to accept automated digitized farm field boundaries, and can also provide attachment of existing digitized farm field boundaries in precision farming contexts as captured with in-field spatial data of the operators. It may also associate the information such as to those farm fields. As indicated in FIGS. 3a and 4, embodiments can have a geo-spatial agronomic image display (41), and can simultaneously display multiple zoomed geo-spatial agronomic images such as through a multiple simultaneous zoomed geo-spatial agronomic image display (42). They can also display tabulated data corresponding to at least one of the geo-spatial agronomic images.

As mentioned earlier, the present invention includes a variety of aspects, which may be combined in different ways. The above descriptions are provided to list elements and describe some of the embodiments of the present invention. These elements are listed with initial embodiments, however it should be understood that they may be combined in any manner, in any context, and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, contexts, and applications with any number of the disclosed elements, with each element alone, and also with any and all various permutations and combinations of all elements in this or any subsequent application.

As can be easily understood from the foregoing, the basic concepts involve both a computer system configured to perform functions as well as methods and techniques to accomplish the appropriate function. In addition, while some devices are disclosed, it should be understood that these not only accomplish certain methods but also can be varied in a number of ways. Importantly, as to all of the foregoing, all of these facets should be understood to be encompassed by this disclosure.

The discussion in this application is intended to serve as only an initial description. The reader should be aware that the specific discussion may not explicitly describe all embodiments or contexts possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in this or any subsequent patent application.

It should also be understood that a variety of changes may be made without departing from the essence of the invention. Such changes are also implicitly included in the description. They still fall within the scope of this invention. A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished. As broad a base of claims as deemed within the applicant's right may be included independently, dependently, as an overall system, or as components of a system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates and visa versa. Regarding this last aspect, as but one example, the disclosure of a "display" should be understood to encompass disclosure of the act of "displaying"—whether explicitly discussed or not—and, conversely, were there effectively disclosure of the act of "displaying", such a disclosure should be understood to encompass disclosure of a "display", a "display element", and even a "means for displaying". Such changes and alternative terms are to be understood to be explicitly included in the description.

Any patents, publications, or other references mentioned in this application for patent are hereby incorporated by reference, including but not limited to the list set forth below which aid in providing general background understanding among other aspects. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition as well as "Webster's New World Computer Dictionary", Tenth Edition and Barron's Business Guides "Dictionary of Computer and Internet Terms", Ninth Edition are hereby incorporated by reference. All references listed in the following list of references or other documents or references filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

I. U.S. PATENT DOCUMENTS

| DOCUMENT NO. & KIND CODE (if known) | PUB'N DATE mm-dd-yyyy | PATENTEE OR APPLICANT NAME |
|---|---|---|
| US2006/0074560 | Apr. 6, 2006 | Dyer et al. |
| US20020040273 | Apr. 4, 2004 | John et al. |
| US20020059091 | May 16, 2002 | Hay et al. |
| US20020075329 | Jun. 20, 2002 | Prabhu et al. |
| US20030071814 | Apr. 17, 2003 | Jou et al. |
| US20030085918 | May 8, 2003 | Beaumont et al. |
| U.S. Pat. No. 7,047,133 | May 16, 2006 | Dyer et al. |
| U.S. Pat. No. 7,015,911 | Mar. 21, 2006 | Shaughnessy et al. |
| U.S. Pat. No. 6,999,877 | Feb. 14, 2006 | Dyer et al |
| U.S. Pat. No. 6,995,768 | Feb. 7, 2006 | Jou et al. |
| U.S. Pat. No. 6,442,483 | Aug. 27, 2002 | Doglione |
| U.S. Pat. No. 6,434,258 | Aug. 13, 2002 | Wiens |
| U.S. Pat. No. 6,671,698 | Sep. 25, 2003 | Pickett et al. |
| U.S. Pat. No. 6,691,135 | Sep. 25, 2003 | Pickett et al. |
| U.S. Pat. No. 6,707,454 | Mar. 16, 2004 | Barg et al. |
| U.S. Pat. No. 6,990,459 | Aug. 1, 2002 | Schneider |
| U.S. Pat. No. 6,356,896 | Mar. 12, 2002 | Cheng et al, |
| U.S. Pat. No. 6,307,573 | Oct. 23, 2001 | Barros |
| U.S. Pat. No. 6,301,579 | Oct. 9, 2001 | Becker |
| U.S. Pat. No. 6,240,360 | May 29, 2001 | Phelan |
| U.S. Pat. No. 6,216,130 | Apr. 10, 2001 | Hougaard et al. |
| U.S. Pat. No. 6,208,345 | Mar. 27, 2001 | Sheard |
| U.S. Pat. No. 6,119,069 | Sep. 12, 2000 | McCauley |
| U.S. Pat. No. 6,107,961 | Aug. 22, 2000 | Takagi |
| U.S. Pat. No. 6,058,351 | May 2, 2000 | McCauley |
| U.S. Pat. No. 6,034,697 | Mar. 7, 2000 | Becker |
| U.S. Pat. No. 5,897,619 | Apr. 27, 1999 | Hargrove, Jr. et al. |
| U.S. Pat. No. 5,467,271 | Nov. 14, 1995 | Abel et al. |
| US20060125828 | Jun. 15, 2006 | Harrison et al. |
| US20060197763 | Sep. 7, 2006 | Harrison et al. |
| US20020198736 | Dec. 26, 2002 | Harrison |
| US20030220734 | Nov. 27, 2003 | Harrison et al. |
| US20050116696 | Jun. 2, 2005 | Suematsu |
| US20050125237 | Jun. 9, 2005 | Harrison |
| U.S. Pat. No. 7,054,741 | Nov. 27, 2003 | Harrison et al. |
| U.S. Pat. No. 7,047,135 | May 16, 2006 | Dyer et al |

II. NON-PATENT LITERATURE

Historical Corn Productivity Index, North Central States (Actual Yield/Potential Yield); Resource Management Domains in Illinois, Productivity Index, 1998, 2 pages Further, the applicant(s) should be understood to have support to claim and make a statement of invention to at least: i) each of the data utilization devices as herein explicitly or implicitly disclosed and described, ii) the related methods disclosed and described, iii) similar, equivalent, and even implicit variations of each of these devices and methods, iv)

those alternative designs that accomplish each of the functions shown as are disclosed and described, v) those alternative designs and methods that accomplish each of the functions shown as are implicit to accomplish that which is disclosed and described, vi) each feature, component, and step shown as separate and independent inventions, vii) the applications enhanced by the various systems or components disclosed, viii) the resulting products or output produced by such systems or components, ix) each system, method, and element shown or described as now applied to any specific field or application mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented. In addition and as to computer aspects and each aspect amenable to programming or other electronic automation, the applicant(s) should be understood to have support to claim and make a statement of invention to at least: xiii) processes performed with the aid of or on a computer as described throughout the above discussion, xiv) a programmable apparatus as described throughout the above discussion, xv) a computer readable memory encoded with data to direct a computer comprising means or elements which function as described throughout the above discussion, xvi) a computer configured as herein disclosed and described, xvii) individual or combined subroutines and programs as herein disclosed and described, xviii) the related methods disclosed and described, xix) similar, equivalent, and even implicit variations of each of these systems and methods, xx) those alternative designs which accomplish each of the functions shown as are disclosed and described, xxi) those alternative designs and methods which accomplish each of the functions shown as are implicit to accomplish that which is disclosed and described, xxii) each feature, component, and step shown as separate and independent inventions, and xxiii) the various combinations and permutations of each of the above.

With regard to claims, it should be understood that for practical reasons and so as to avoid great expansion of the examination burden, the applicant may at any time present only initial claims or perhaps only initial claims with only initial dependencies or with alternative groups or elements. It is intended that all of these have support to be expanded within the scope of the existing disclosure. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that unsubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art should not be reasonably expected to have drafted a claim that would have literally encompassed such alternative embodiments.

Further, when used, the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent, continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent, continuation, division, or continuation-in-part application thereof or any reissue or extension thereon.

What is claimed is:

1. A method of automatically establishing agronomically relational information comprising the steps of:
   identifying an initial agronomic target associated with an agronomic parcel or legal entity;
   requesting information on said initial agronomic target;
   locating at least some information on said initial agronomic target;
   establishing an information set for said initial agronomic target;
   automatically searching for information on at least one additional, relationally-linked agronomic land use entity;
   locating at least some information on said additional, relationally-linked agronomic entity;
   establishing an information set on at least one additional, relationally-linked agronomic entity; and
   dynamically linking information from both said initial agronomic target and said additional, relationally-linked agronomic entity based on agronomic relationships agronomically-imputable to such data;
   congregating at least some information on both said initial agronomic target and said additional, relationally-linked agronomic entity by ascertaining at least some commonality agronomic information between said initial agronomic target and said additional, relationally-linked agronomic entity;
   simultaneously hierarchically displaying real and virtual land use information from said dynamically linked initial agronomic target and said dynamically linked additional, relationally-linked agronomic entity, wherein said virtual land use information presents land use information agronomically-inferred from said data.

2. A method of automatically establishing agronomically relational information as described in claim 1 wherein said step of congregating at least some information on both said initial agronomic target and said additional, relationally-linked agronomic entity comprises the step of creating meta-syntactic agronomic information from said information set for said initial agronomic target and said information set for said additional, relationally-linked agronomic entity.

3. A method of automatically establishing agronomically relational information as described in claim 2 wherein said step of creating meta-syntactic agronomic information from said information set for said initial agronomic target and said information set for said additional, relationally-linked agronomic entity comprises the step of conducting a multiple agronomic information database comparison relative to information on said initial agronomic target and information on said additional, relationally-linked agronomic entity.

4. A method of automatically establishing agronomically relational information as described in claim 3 wherein said step of conducting a multiple agronomic information database comparison relative to information on said initial agronomic target and information on said additional, relationally-linked agronomic entity comprises the step of accomplishing a comparative inconsistency check between multiple agronomic information databases.

5. A method of automatically establishing agronomically relational information as described in claim 3 wherein said step of conducting a multiple agronomic information database comparison relative to information on said initial agronomic target and information on said additional, relationally-linked agronomic entity comprises the step of accomplishing a comparative unavailability check between multiple agronomic information databases.

6. A method of automatically establishing agronomically relational information as described in claim 2 wherein said step of creating meta-syntactic agronomic information from said information set for said initial agronomic target and said information set for said additional, relationally-linked agronomic entity comprises the step of imputing a boundary for at least one of said initial agronomic target or at least one said additional, relationally-linked agronomic entity.

7. A method of automatically establishing agronomically relational information as described in claim 1 wherein said step of providing at least some hierarchical information on said initial agronomic target comprises the step of hierarchically displaying at least some information selected from a group consisting of:
  acreage information,
  crop information, and
  conservation information.

8. A method of automatically establishing agronomically relational information as described in claim 7 wherein said step of providing at least some hierarchical information on said initial agronomic target comprises a step selected from a group consisting of:
  displaying geo-spatial bar graph information,
  displaying color coded geo-spatial information, and
  displaying color coded geo-spatial bar graph information.

9. A method of automatically establishing agronomically relational information as described in claim 1, 7, or 8 wherein said step of automatically searching for information on at least one additional, relationally-linked agronomic entity comprises the step of conducting a search for inductively linked information.

10. A method of automatically establishing agronomically relational information as described in claim 9 wherein said step of conducting a search for inductively linked information comprises the step of conducting a fuzzy logic data similarity comparison between said initial agronomic target and said additional, relationally-linked agronomic entity.

11. A method of automatically establishing agronomically relational information as described in claim 10 wherein said step of conducting a fuzzy logic data similarity comparison between said initial agronomic target and said additional, relationally-linked agronomic entity comprises the step of conducting a fuzzy logic geo-spatial data similarity comparison between said initial agronomic target and said additional, relationally-linked agronomic entity.

12. A method of automatically establishing agronomically relational information as described in claim 10 wherein said step of conducting a fuzzy logic data similarity comparison between said initial agronomic target and said additional, relationally-linked agronomic entity comprises the step of conducting a fuzzy logic data similarity comparison between information on said initial agronomic target and information on said additional, relationally-linked agronomic entity selected from a group consisting of:
  parcel identification information,
  farm identification information,
  physically aggregated parcel information,
  physically aggregated parcel component information,
  ownership information, and
  land management information.

13. A method of automatically establishing agronomically relational information as described in claim 1 wherein said step of simultaneously displaying real and virtual land use information comprises the step of displaying a geo-spatial agronomic image.

14. A method of automatically establishing agronomically relational information as described in claim 13 wherein said step of displaying a geo-spatial agronomic image comprises the step of simultaneously displaying multiple zoomed geo-spatial agronomic images.

15. A method of automatically establishing agronomically relational information as described in claim 14 and further comprising the step of displaying tabulated data corresponding to at least one of said geo-spatial agronomic images.

* * * * *